United States Patent
Ito et al.

(10) Patent No.: US 9,825,491 B2
(45) Date of Patent: Nov. 21, 2017

(54) POWER FEEDING APPARATUS, POWER FEEDING METHOD, AND STORAGE MEDIUM

(71) Applicant: CANON KABUSHIKI KAISHA, Tokyo (JP)

(72) Inventors: Nobuyasu Ito, Kawasaki (JP); Takahiro Haraguchi, Kawasaki (JP); Akitomo Fukui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 813 days.

(21) Appl. No.: 14/246,867

(22) Filed: Apr. 7, 2014

(65) Prior Publication Data
US 2014/0300200 A1 Oct. 9, 2014

(30) Foreign Application Priority Data
Apr. 8, 2013 (JP) ................. 2013-080687

(51) Int. Cl.
| | |
|---|---|
| H01F 27/42 | (2006.01) |
| H01F 37/00 | (2006.01) |
| H01F 38/00 | (2006.01) |
| H02J 17/00 | (2006.01) |
| H02J 7/00 | (2006.01) |
| H02J 7/02 | (2016.01) |
| H04B 5/00 | (2006.01) |

(52) U.S. Cl.
CPC ............ *H02J 17/00* (2013.01); *H02J 7/0047* (2013.01); *H02J 7/025* (2013.01); *H04B 5/0037* (2013.01); *H02J 2007/005* (2013.01)

(58) Field of Classification Search
CPC .......... H02J 17/00; H02J 7/0047; H02J 7/025; H02J 2007/005; H04B 5/0037
USPC ........................................................ 307/104
See application file for complete search history.

(56) References Cited

U.S. PATENT DOCUMENTS

| | | | | |
|---|---|---|---|---|
| 2011/0244794 A1* | 10/2011 | Nakano | ................... | H02J 7/025 455/41.1 |
| 2012/0280650 A1* | 11/2012 | Kim | ........................ | H02J 17/00 320/108 |

FOREIGN PATENT DOCUMENTS

| | | |
|---|---|---|
| JP | 2012-014422 A | 1/2012 |
| JP | 2012175763 A | 9/2012 |
| WO | 2012108663 A2 | 8/2012 |

\* cited by examiner

*Primary Examiner* — Richard Tan
(74) *Attorney, Agent, or Firm* — Canon U.S.A., Inc. IP Division

(57) ABSTRACT

There is provided a power feeding apparatus including a remaining battery level reception unit configured to receive a remaining battery level of a respective secondary battery included in a respective power receiving apparatus among a plurality of power receiving apparatuses from the respective power receiving apparatuses, a power feeding time determination unit configured to determine power feeding time for the power receiving apparatuses based on the remaining battery level, and a power feeding unit configured to wirelessly feed power to the power receiving apparatuses for the power feeding time.

5 Claims, 35 Drawing Sheets

| SERIAL NUMBER 301 | POWER RECEIVING APPARATUS ID 302 | REMAINING BATTERY LEVEL 303 | POWER TRANSFER PERIOD OF POWER RECEIVING APPARATUS 304 |
|---|---|---|---|
| 1 | AA | 90% | 16 SECONDS |
| 2 | BB | 80% | 32 SECONDS |
| 3 | CC | 70% | 47 SECONDS |
| 4 | DD | 50% | 79 SECONDS |
| 5 | EE | 20% | 126 SECONDS |

FIG.20

| ID 311 | POWER RECEIVING APPARATUS ID 312 | PRESENCE OR ABSENCE OF POWER FEEDING REQUEST 313 | FUNCTION IN OPERATION 314 | PRESENCE OR ABSENCE OF SECONDARY BATTERY 315 | REMAINING BATTERY LEVEL 316 |
|---|---|---|---|---|---|
| | 001 | PRESENT | PHONE CALL | PRESENT | 10 |
| | 002 | PRESENT | DOWNLOAD | PRESENT | 50 |
| | 101 | PRESENT | SLEEP | ABSENT | ABSENT |

310

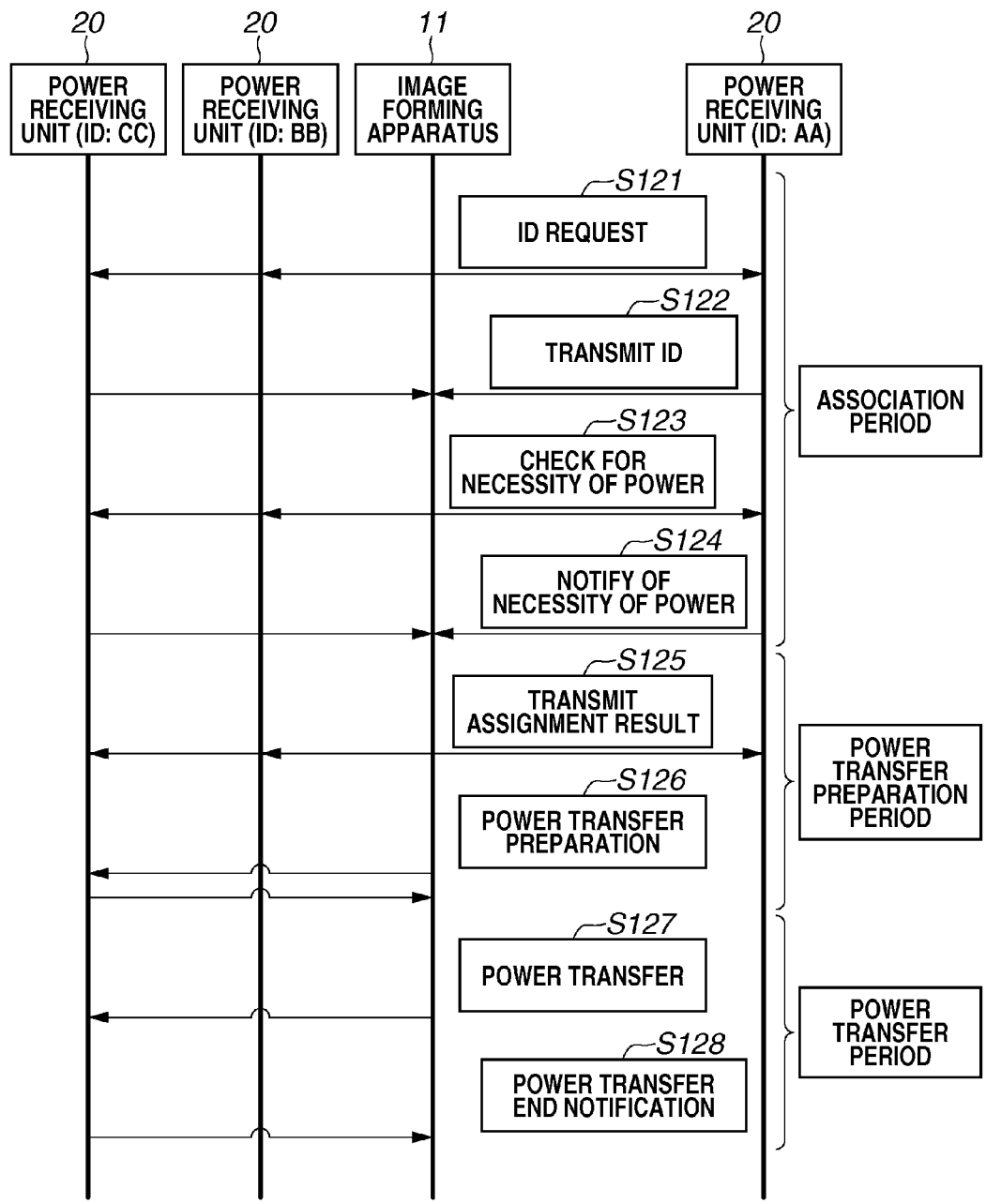

FIG.24A

| POWER RECEIVING APPARATUS ID | FUNCTION IN OPERATION | PRESENCE OR ABSENCE OF SECONDARY BATTERY | REMAINING BATTERY LEVEL |
|---|---|---|---|
| AA | PHONE CALL | PRESENT | 10 |
| BB | DOWNLOAD | PRESENT | 50 |
| CC | SLEEP | ABSENT | ABSENT |

FIG.24B

POWER RECEIVING APPARATUS ID × FUNCTION IN OPERATION × PRESENCE OR ABSENCE OF SECONDARY BATTERY × REMAINING BATTERY LEVEL

| POWER RECEIVING APPARATUS ID | | FUNCTION IN OPERATION | | PRESENCE OR ABSENCE OF SECONDARY BATTERY | | REMAINING BATTERY LEVEL | | POWER FEEDING NECESSITY DEGREE |
|---|---|---|---|---|---|---|---|---|
| AA | 0.5 | PHONE CALL | 0.9 | PRESENT | 0.9 | 10 | 0.9 | 0.3645 |
| BB | 0.5 | DOWNLOAD | 0.6 | PRESENT | 0.9 | 50 | 0.5 | 0.135 |
| CC | 1.0 | SLEEP | 1.0 | ABSENT | 1.0 | ABSENT | 1.0 | 1.0 |

FIG.26A

| POWER RECEIVING APPARATUS ID | FUNCTION IN OPERATION | PRESENCE OR ABSENCE OF SECONDARY BATTERY | REMAINING BATTERY LEVEL |
|---|---|---|---|
| AA | PHONE CALL | PRESENT | 10 |
| BB | DOWNLOAD | PRESENT | 50 |

FIG.26B

| POWER RECEIVING APPARATUS ID × FUNCTION IN OPERATION × PRESENCE OR ABSENCE OF SECONDARY BATTERY × REMAINING BATTERY LEVEL | | | | | | | | | |
|---|---|---|---|---|---|---|---|---|---|
| POWER RECEIVING APPARATUS ID | | FUNCTION IN OPERATION | | PRESENCE OR ABSENCE OF SECONDARY BATTERY | | REMAINING BATTERY LEVEL | | POWER FEEDING NECESSITY DEGREE |
| AA | 0.5 | PHONE CALL | 0.9 | PRESENT | 0.9 | 10 | 0.9 | 0.3645 |
| BB | 0.5 | DOWNLOAD | 0.6 | PRESENT | 0.9 | 50 | 0.5 | 0.135 |

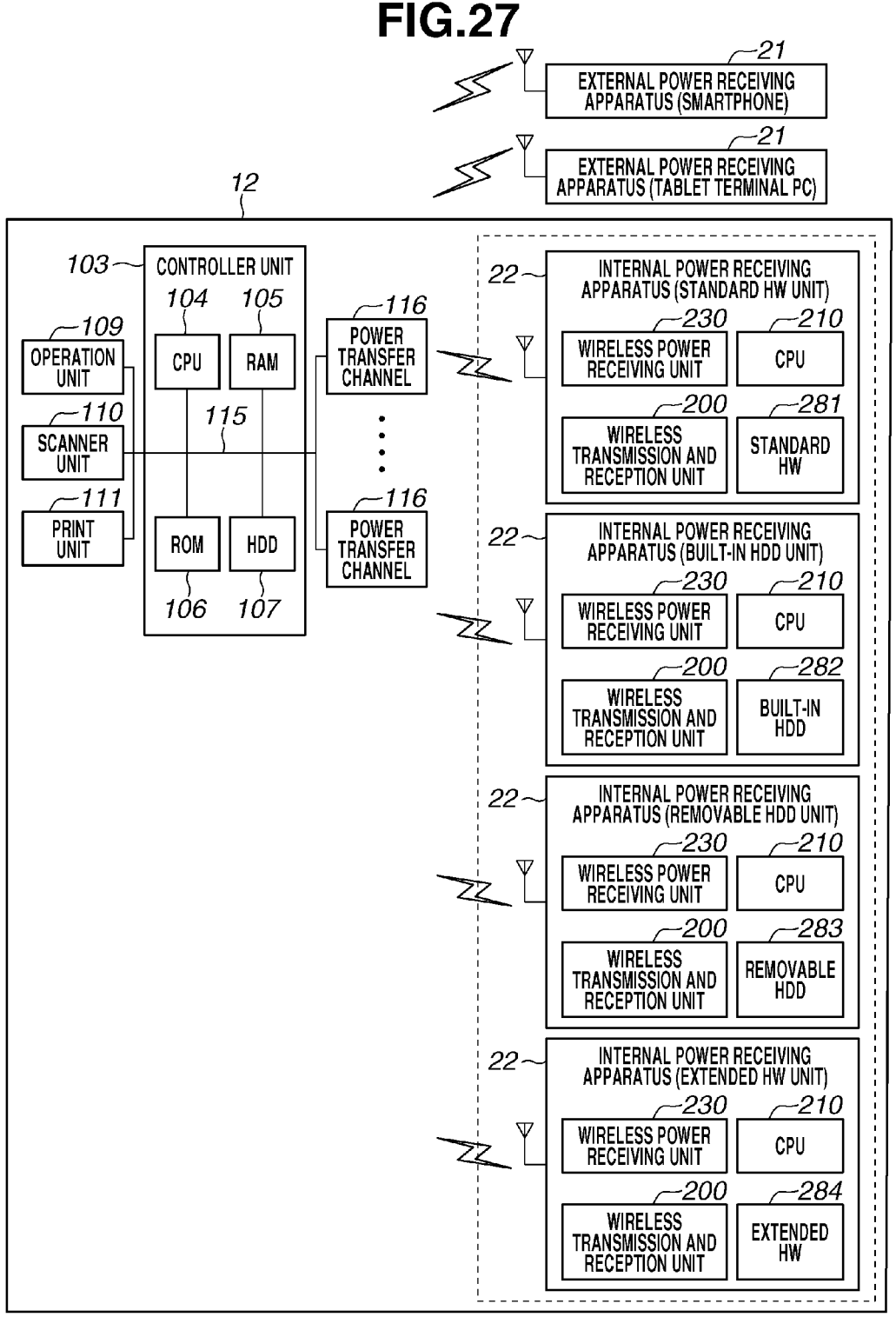

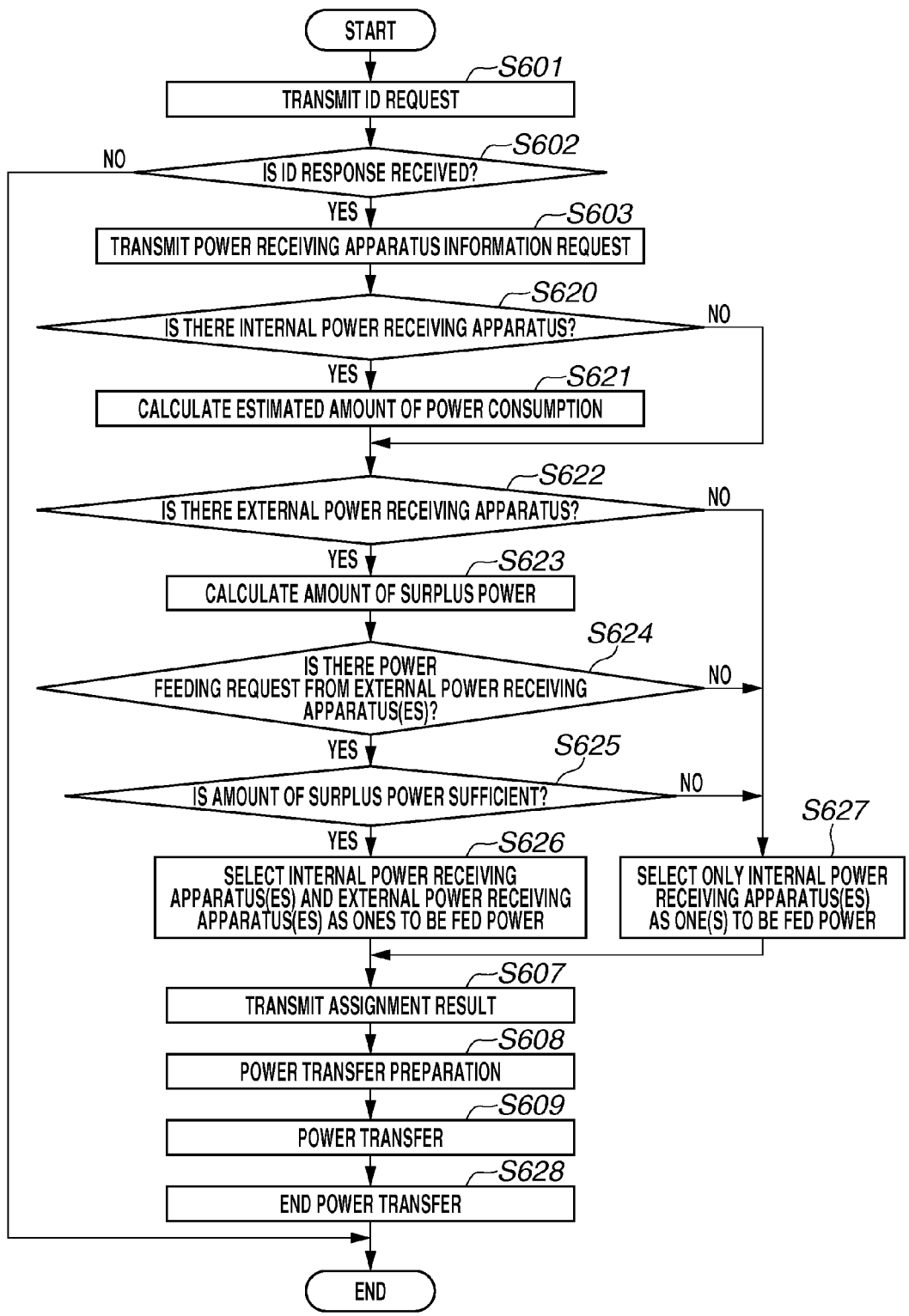

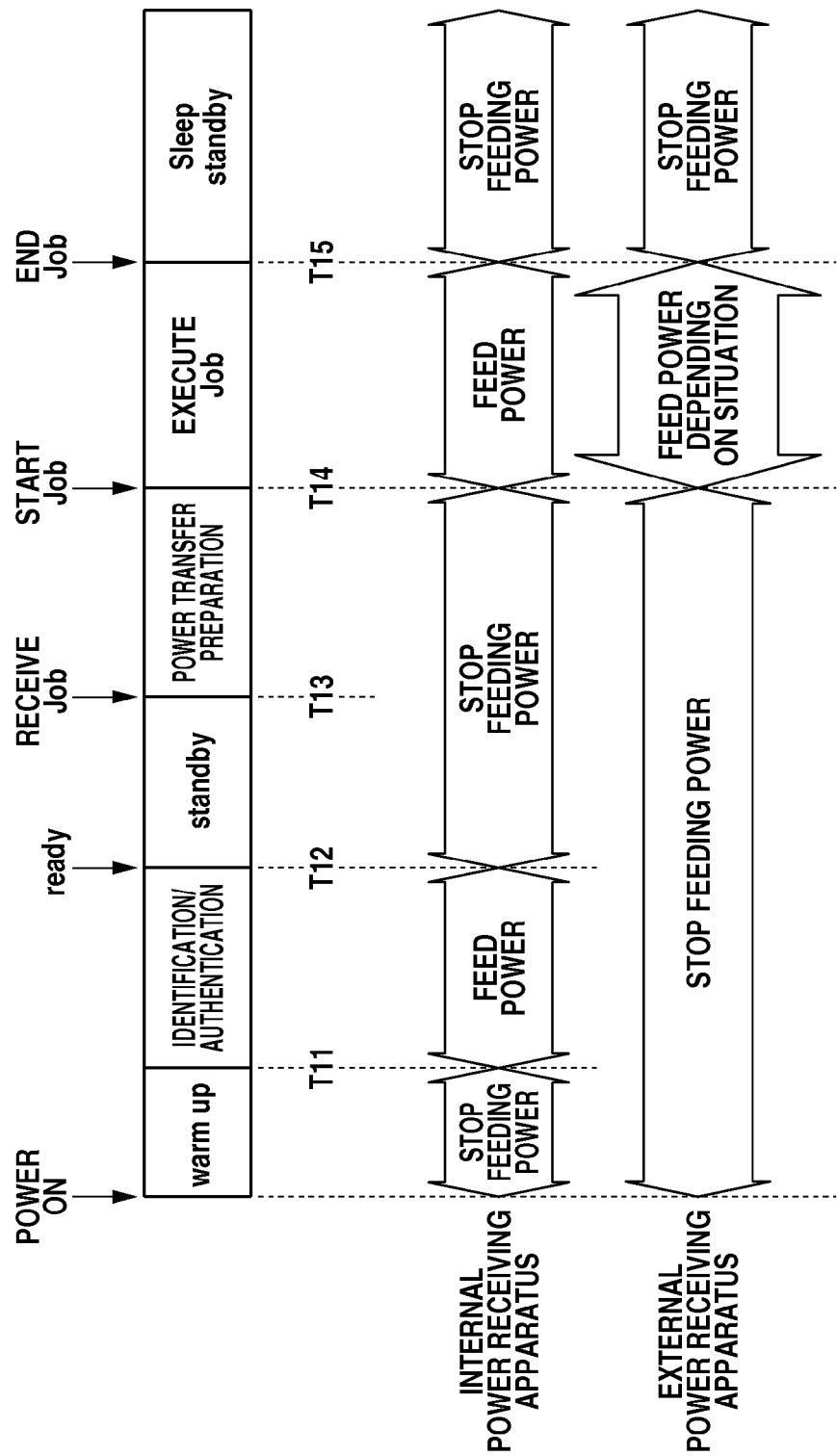

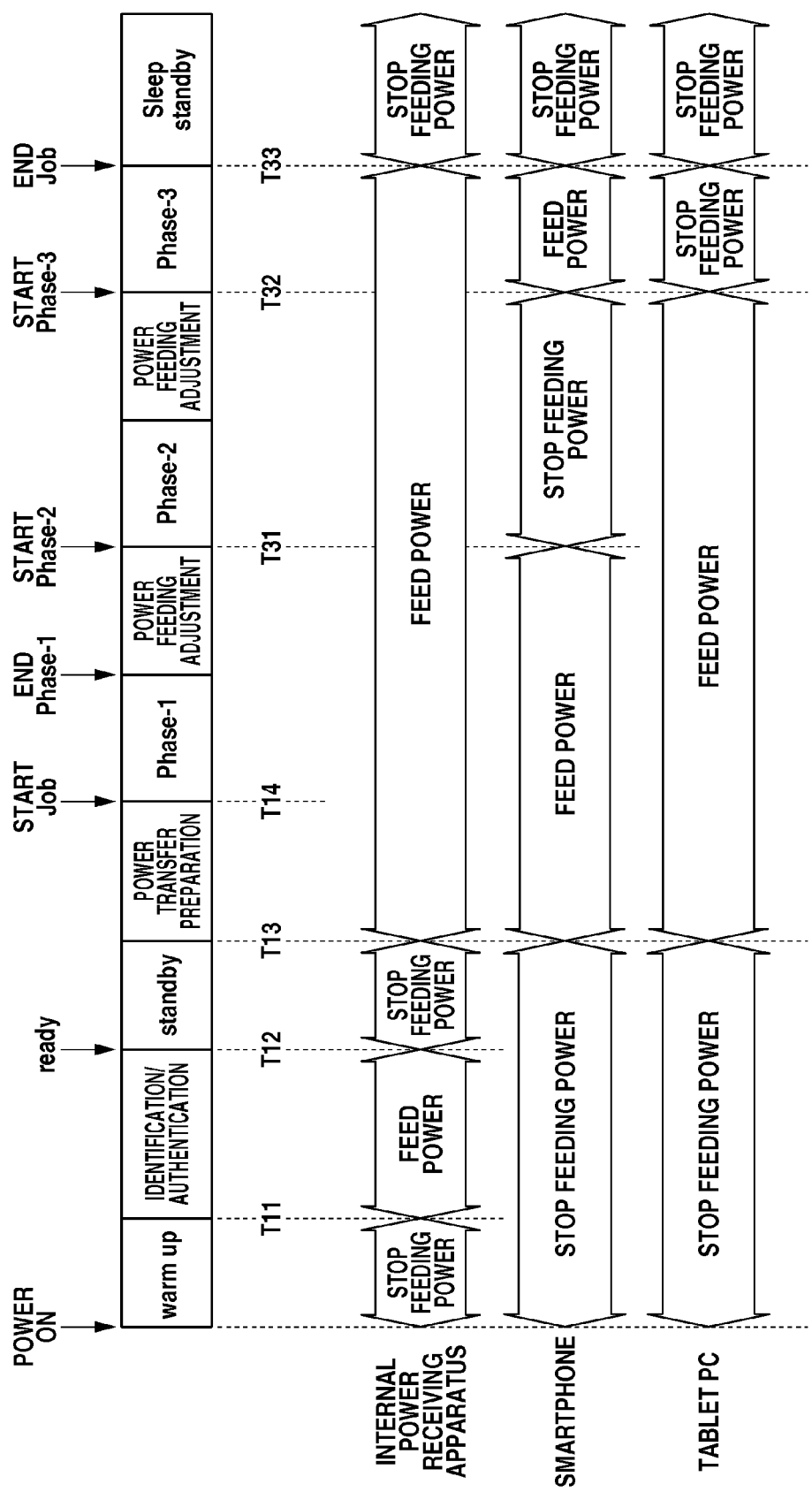

POWER FEEDING APPARATUS, POWER FEEDING METHOD, AND STORAGE MEDIUM

BACKGROUND OF THE INVENTION

Field of the Invention

The present invention relates to a power feeding apparatus, a power feeding method, and a storage medium.

Description of the Related Art

A technique for transmitting power by a wireless non-contact method and operating information processing apparatuses such as a mobile terminal is known. As built-in central processing units (CPUs) increase in speed and performance and display screens increase in size, mobile terminals are increasing in power consumption. Operable time becomes short if the mobile terminals operate only with power charged in their built-in battery.

Techniques for solving such a problem of a mobile terminal by wireless power feeding are known. For example, Japanese Patent Application Laid-Open No. 2012-14422 discusses a technique in which a mobile terminal, when exchanging data in cooperation with an external apparatus, secures power by wirelessly receiving power from a power feeding apparatus and performs the intended data transmission and reception.

SUMMARY OF THE INVENTION

The total amount of power a power feeding apparatus can feed is determined in advance. When feeding power to a plurality of power receiving apparatuses, the power feeding apparatus therefore needs to appropriately control the power feeding to the plurality of power receiving apparatuses.

The present invention features a technique for appropriately controlling power feeding to a plurality of power receiving apparatuses.

Further features of the present invention will become apparent from the following description of exemplary embodiments with reference to the attached drawings.

BRIEF DESCRIPTION OF THE DRAWINGS

FIG. 20 is a table illustrating an example of a power receiving apparatus information.

FIG. 23 is a sequence diagram illustrating assignment processing to two power transfer channels.

FIGS. 24A and 24B are tables illustrating the assignment processing to two power transfer channels.

FIGS. 26A and 26B are tables illustrating the assignment processing to two power transfer channels.

FIG. 27 is a diagram illustrating a wireless power feeding system.

FIG. 28 is a flowchart illustrating power feeding processing.

FIG. 29 is a diagram illustrating the power feeding processing.

FIG. 35 is a diagram illustrating the power feeding processing.

DESCRIPTION OF THE EMBODIMENTS

Various exemplary embodiments, features, and aspects of the invention will be described in detail below with reference to the drawings.

Figure 1:
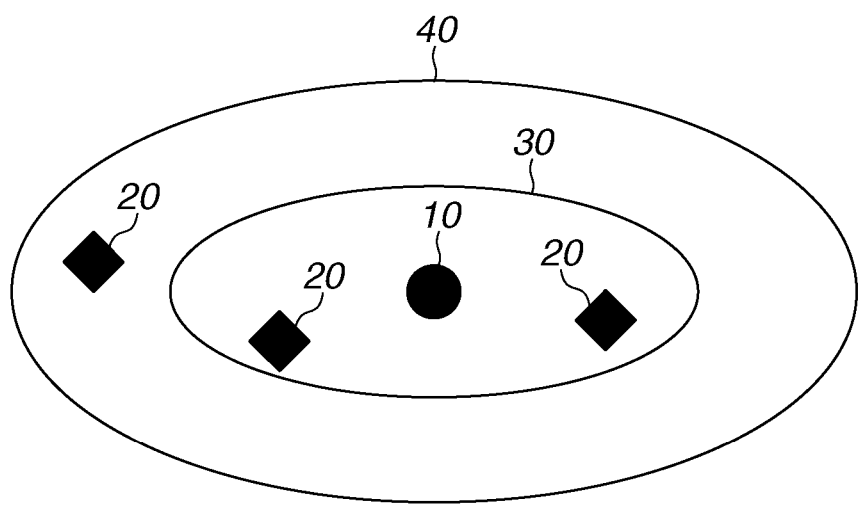
FIG. 1 is a diagram illustrating a wireless power feeding system.

FIG. 1 is a diagram illustrating a wireless power feeding system. The wireless power feeding system includes an image forming apparatus 10 serving as a power feeding apparatus, and power receiving apparatuses 20. Examples of the power receiving apparatuses 20 include portable terminals such as a smartphone and a mobile phone. FIG. 1 illustrates three power receiving apparatuses 20, whereas the number of power receiving apparatuses 20 is not limited to that of the present exemplary embodiment.

The image forming apparatus 10 wirelessly transmits power to the power receiving apparatuses 20. The image forming apparatus 10 performs data communication needed for power feeding with the power receiving apparatuses 20. The power receiving apparatuses 20 wirelessly receive power from the image forming apparatus 10. The power receiving apparatuses 20 perform data communication needed for power feeding with the image forming apparatus 10.

A power feeding area 30 is an area where the image forming apparatus 10 can feed power to the power receiving apparatuses 20. The range of the power feeding area 30 is determined by power feeding capability of the image forming apparatus 10. As illustrated in FIG. 1, if there is a plurality of power receiving apparatuses 20 in the power feeding area 30, the image forming apparatus 10 can wirelessly feed power to each of the power receiving apparatuses 20.

A communication area 40 is an area where the image forming apparatus 10 can perform data communication with the power receiving apparatuses 20. The range of the communication area 40 is wider than that of the power feeding area 30. The communication area 40 covers the power feeding area 30.

Figure 2:
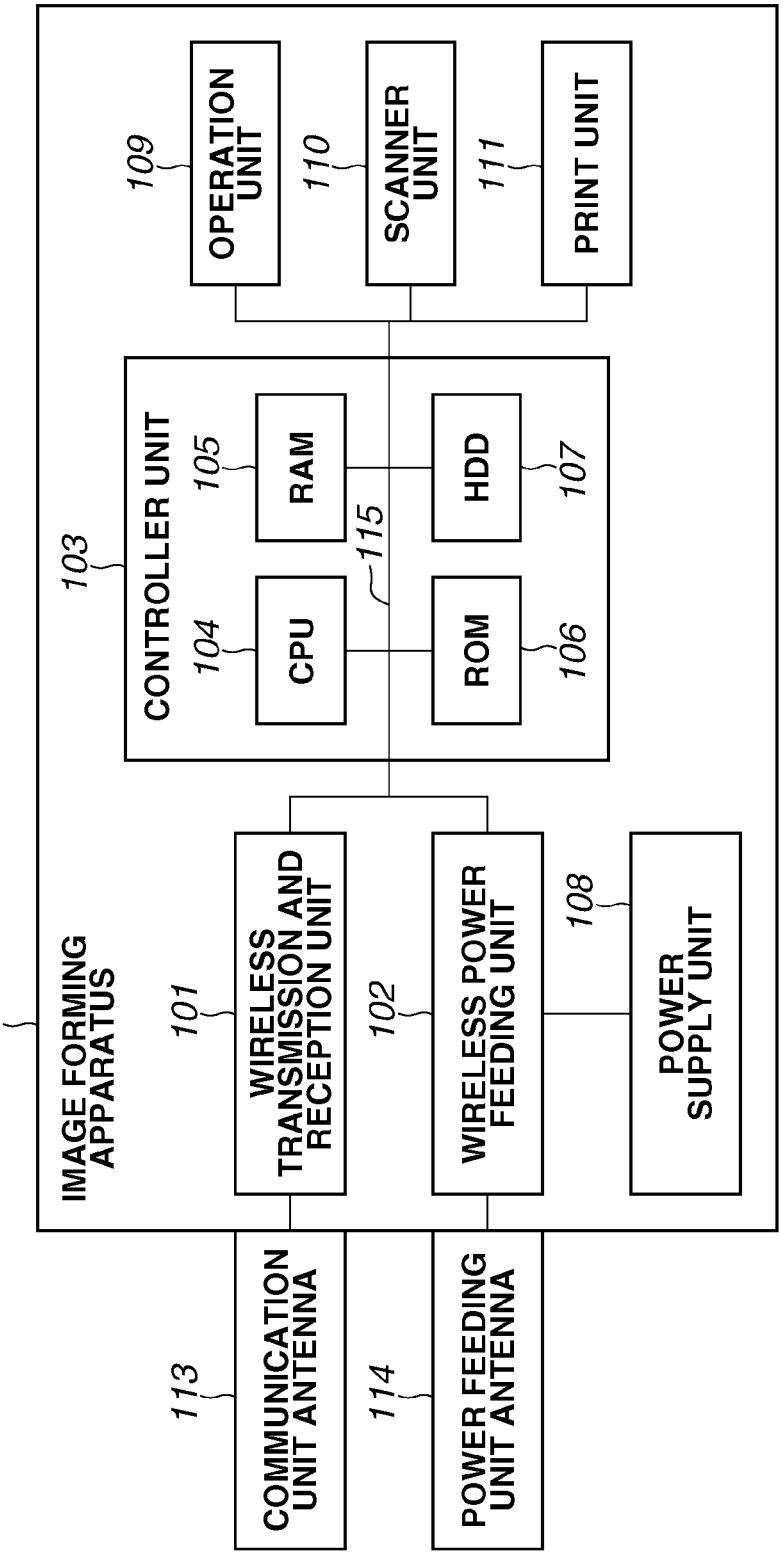
FIG. 2 is a diagram illustrating an image forming apparatus.

FIG. 2 is a diagram illustrating the image forming apparatus 10. The imaging forming apparatus 10 includes a controller unit 103, a wireless transmission and reception unit 101, a wireless power feeding unit 102, a power supply unit 108, an operation unit 109, a scanner unit 110, a print unit 111, a communication unit antenna 113, and a power feeding unit antenna 114.

The controller unit 103 is connected to the operation unit 109, the scanner unit 110, and the print unit 111 by a bus 115. The controller unit 103 is further connected to the wireless transmission and reception unit 101 and the wireless power feeding unit 102 by the bus 115.

The print unit 111 is an image output device. The print unit 111 forms a latent image according to image data output from the controller unit 103, and transfers the latent image onto a sheet. The scanner unit 110 is an image input device. The scanner unit 110 reads and computerizes an image printed on a sheet, and outputs the computerized image to the controller unit 103.

The operation unit 109 is a user interface. The operation unit 109 is a user interface for accepting various setting inputs from a user. Examples of the setting inputs include settings of the image forming apparatus 10, operation instructions to the image forming apparatus 10, a power transfer period which defines the time for feeding power to the power receiving apparatuses 20, and the order of power feeding to the power receiving apparatuses 20. The operation unit 109 includes a display unit for displaying various types of information. The power supply unit 108 supplies power to the components of the image forming apparatus 10 in a wired manner.

The wireless transmission and reception unit 101 modules and demodulates wireless signals transmitted and received via the communication unit antenna 113. The wireless transmission and reception unit 101 is connected to a CPU 104 by the bus 115 and controlled by the CPU 104. The image forming apparatus 10 receives power receiving apparatus information and print data from the power receiving apparatuses 20 and transmits a power feeding instruction to the power receiving apparatuses 20 via the communication unit antenna 113 and the wireless transmission and reception unit 101. The power receiving apparatus information includes identifier (ID) information about the power receiving apparatuses 20 and information about remaining battery levels of secondary batteries included in the power receiving apparatuses 20.

The wireless power feeding unit 102 is a power feeding unit for feeding power to the power receiving apparatuses 20 in a non-contact manner. The wireless power feeding unit 102 is connected to the power feeding unit antenna 114, and feeds electrical energy to the power receiving apparatuses 20 via the power feeding unit antenna 114. In other words, the wireless power feeding unit 102 feeds power to the power receiving apparatuses 20. The CPU 104 performs output control on the wireless power feeding unit 102.

The controller unit 103 includes the CPU 104, a random access memory (RAM) 105, a read-only memory (ROM) 106, and a hard disk drive (HDD) 107. The RAM 105 is a work memory. The RAM 105 stores power receiving apparatus information. The CPU 104 processes the power receiving apparatus information obtained from the power receiving apparatuses 20 according to a program stored in the ROM 106, and records the processed power receiving apparatus information in the RAM 105. The RAM 105 also stores information such as a setting value of the power transfer period and the order of power feeding. The CPU 104 stores such information in the RAM 105.

The ROM 106 stores a program for controlling the CPU 104. The HDD 107 temporarily stores image data input from the scanner unit 110. The CPU 104 processes the print data received from the power receiving apparatuses 20 according to a program stored in the ROM 106, and records the processed print data in the HDD 107. The print data is also output to the print unit 111.

The CPU 104 operates according to a program stored in the ROM 106 or the HDD 107 and controls the image forming apparatus 10. The CPU 104 reads a program stored in the ROM 106 and executes the program to implement functions and processing of the image forming apparatus 10 to be described below.

Figure 3:
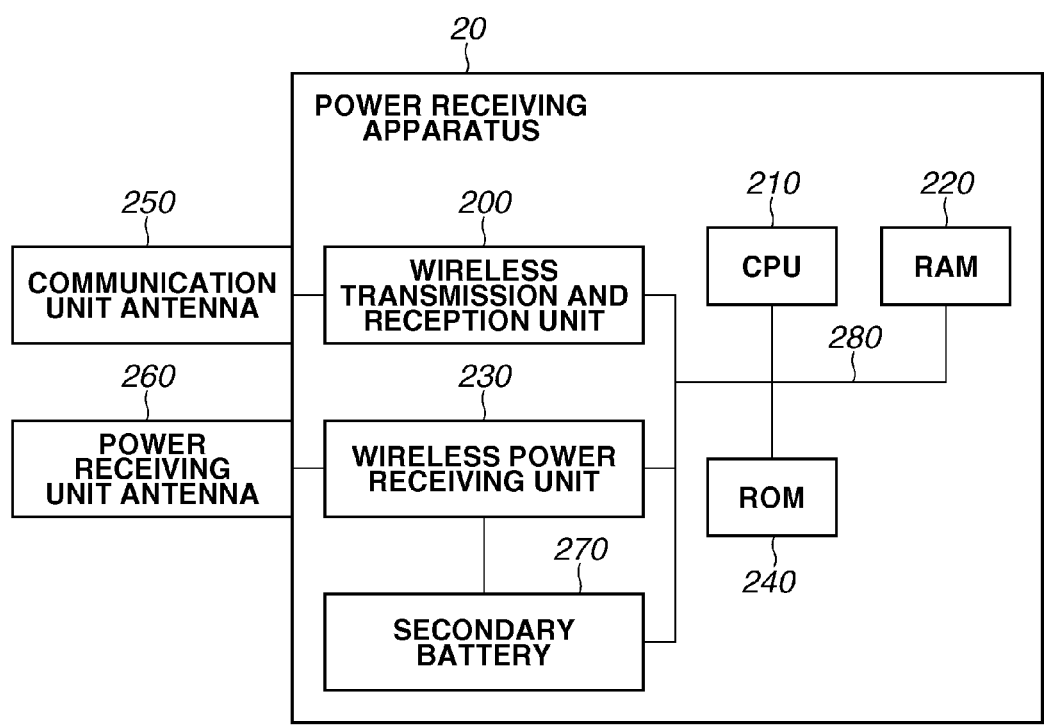
FIG. 3 is a diagram illustrating a power receiving apparatus.

FIG. 3 is a diagram illustrating a power receiving apparatus 20. The power receiving apparatus 20 includes a CPU 210, a RAM 220, a ROM 240, a wireless transmission and reception unit 200, a wireless power receiving unit 230, a communication unit antenna 250, a power receiving antenna 260, and a secondary battery 270. Such components are connected by a bus 280. The CPU 210 controls the power receiving apparatus 20 according to a control programs stored in the ROM 240. The RAM 220 is a work memory to be used when the CPU 210 performs processing. The ROM 240 stores the control program for the CPU 210. The ROM 240 further stores a power receiving apparatus ID unique to the power receiving apparatus 20. A plurality of power receiving apparatuses 20 is identified by their power receiving apparatus IDs.

The CPU 210 reads a program stored in the ROM 204 and executes the program to implement functions and processing of the power receiving apparatus 20 to be described below.

The wireless transmission and reception unit 200 is an interface (IF) for communicating with the image forming apparatus 10. The wireless transmission and reception unit 200 performs communication via the communication unit antenna 250. The wireless power receiving apparatus 230 receives power fed from the wireless power feeding unit 102 of the image forming apparatus 10 via the power receiving unit antenna 260. The secondary battery 270 is charged with the power received by the wireless power receiving apparatus 230.

In the wireless power feeding system, the power receiving apparatuses 20 to be fed power need not necessarily include a secondary battery 270.

Figure 4:
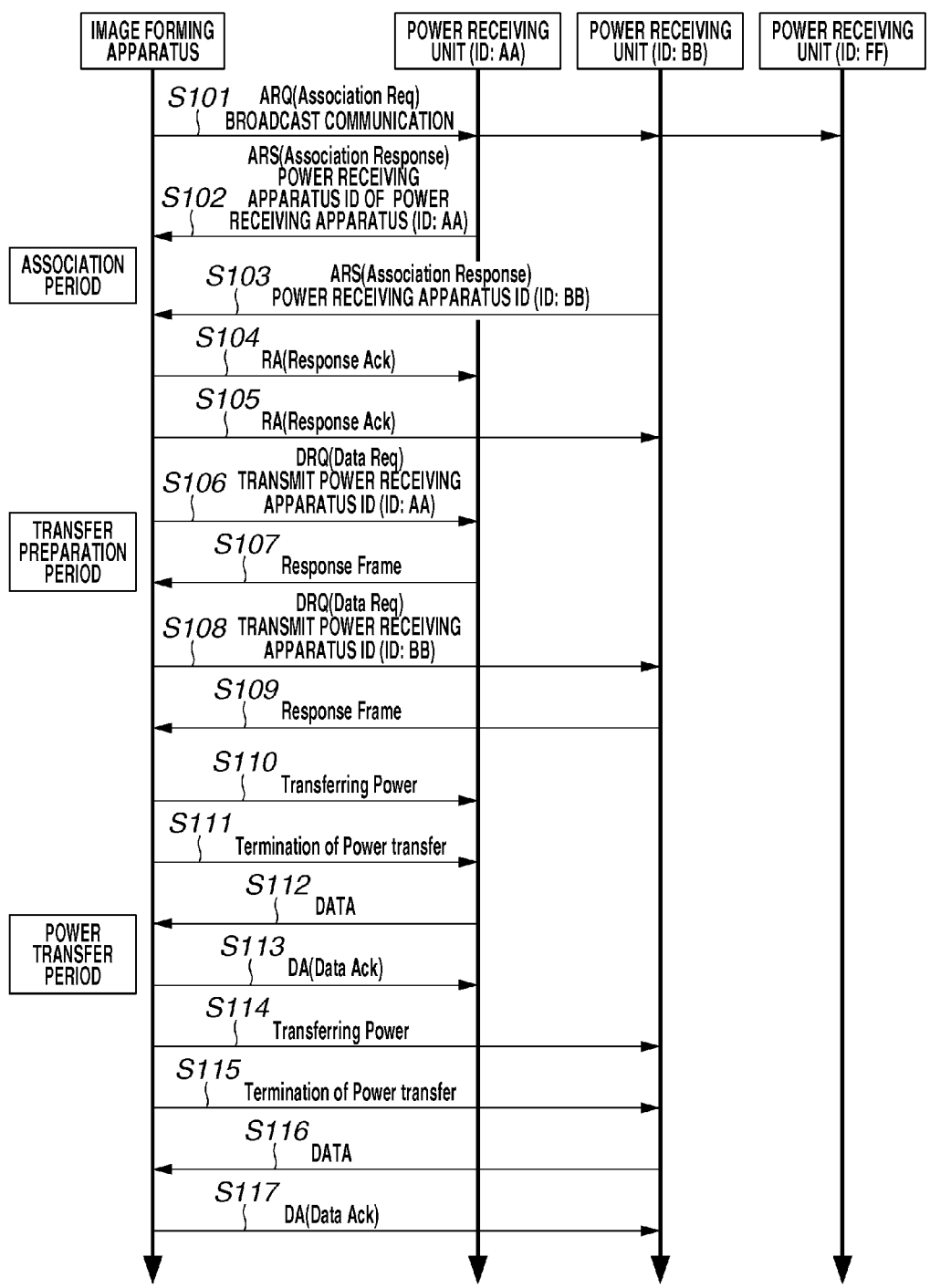
FIG. 4 is a sequence diagram illustrating power feeding processing.

FIG. 4 is a sequence diagram illustrating power feeding processing by the wireless power feeding system. In the power feeding processing, the image forming apparatus 10 feeds power to the power receiving apparatuses 20. FIG. 4 illustrates a case where there are three power receiving apparatuses 20 having a power receiving ID of "AA", "BB", and "FF" in the communication area 40.

In FIG. 4, the image forming apparatus 10 determines to perform power feeding to the power receiving apparatuses 20 having the power receiving apparatus ID of "AA" and "BB", and not to perform wireless power feeding to the power receiving apparatus 20 having the power receiving apparatus ID of "FF". The image forming apparatus 10 then performs processing according to the determination. The power feeding processing for such a case will be described below.

As illustrated in FIG. 4, the power feeding processing is broadly divided into three processes in an association period, a transfer preparation period, and a power transfer period, respectively. With such a series of processes as a frame, the wireless power feeding system repeats the frame to perform power feeding. Each step will be described in detail below.

<Association Period>

In step S101, the CPU 104 of the image forming apparatus 10 performs association request (ARQ: Association Req) processing. The CPU 104 issues a communication command to the wireless transmission and reception unit 101 via the bus 115. The wireless transmission and reception unit 101 performs broadcast communication to the power receiving apparatuses 20 to notify the power receiving apparatuses 20 of a start of power feeding.

The CPU 104 performs the processing of step S101 when the image forming apparatus 10 is powered on or when the image forming apparatus 10 returns to a standby state from a power saving mode such as a sleep state.

In association response (ARS) processing performed in steps S102 and S103, the power receiving apparatuses 20 requiring to receive power transmit their own power receiving apparatus IDs to the image forming apparatus 10. The wireless transmission and reception unit 101 of the image forming apparatus 10 receives the power receiving apparatus IDs. The CPU 104 of the image forming apparatus 10 obtains the power receiving apparatus IDs from the wireless transmission and reception unit 101 via the bus 115. From the power receiving apparatus IDs, the CPU 104 detects the power receiving apparatuses 20 requiring to receive power.

In the example illustrated in FIG. 4, the power receiving apparatuses 20 having the respective power receiving apparatus IDs of "AA" and "BB" transmit their respective power receiving apparatus IDs to the image forming apparatus 10. The power receiving apparatus 20 having the power receiving apparatus ID of "FF" does not transmit its power receiving apparatus ID.

As a result, the processing of the transfer preparation period and the power transfer period to be described below is performed between the image forming apparatus 10 and the two power receiving apparatuses 20 having the respective power receiving apparatus IDs of "AA" and "BB". The processing of the transfer preparation period and the power transfer period is not performed between the image forming apparatus 10 and the power receiving apparatus 20 having the power receiving apparatus ID of "FF".

In steps S104 and S105, the CPU 104 of the image forming apparatus 10 performs response acknowledgment (RA: Response Ack). More specifically, under control of the CPU 104, the wireless transmission and reception unit 101 of the image forming apparatus 10 sends back the power receiving apparatus IDs to the respective power receiving apparatuses 20 to be fed power. The CPU 104 thereby notifies the power receiving apparatuses 20 of acknowledgment of power feeding.

<Transfer Preparation Period>

In steps S106 and S108, the CPU 104 of the image forming apparatus 10 performs data request (DRQ: Data Req) processing. The wireless transmission and reception unit 101 transmits a power transfer apparatus information request to the power receiving apparatuses 20 to be fed power together with the power receiving apparatus IDs.

In response frame processing performed in steps S107 and S109, the power receiving apparatuses 20 receiving the power receiving apparatus information request transmit power receiving apparatus information to the image forming apparatus 10. The CPU 104 of the image forming apparatus 10 obtains the power receiving apparatus information from the wireless transmission and reception unit 101 via the bus 115, and stores the obtained power receiving apparatus information in the RAM 105.

<Power Transfer Period>

In steps S110 and S114, the CPU 104 of the image forming apparatus 10 performs transferring power processing. The CPU 104 issues power feeding time and a power feeding start command to the wireless power feeding unit 102. The wireless power feeding unit 102 starts power feeding (power transfer) according to the power feeding start command.

In termination of power transfer processing performed in steps S111 and S115, the wireless power feeding unit 102 ends the power feeding when the power feeding time ends. Upon ending the power feeding, the wireless power feeding unit 102 transmits a power feeding end notification to the CPU 104 via the bus 115. The wireless transmission and reception unit 101 transmits the power feeding end notification to the power receiving apparatuses 20 that have been fed.

In data processing performed in steps S112 and S116, the power receiving apparatuses 20 receiving the power feeding end notification normally end power reception processing. The power receiving apparatuses 20 each transmit a power reception processing end notification to the image forming apparatus 10. The CPU 104 of the image forming apparatus 10 receives the power reception end notifications from the wireless transmission and reception unit 101 via the bus 115.

In data acknowledgment (DA: Data Ack) processing performed in steps S113 and S117, the wireless transmission and reception unit 101 of the image forming apparatus 10, under control of the CPU 104, transmits a confirmation notification about the reception of the power reception processing end notification to the power receiving apparatuses 20.

The CPU 104 of the image forming apparatus 10 can obtain various types of information from the power receiving apparatuses 20 to be fed power at desired timing during the power transfer period by using communications from the wireless transmission and reception unit 101. More specifically, after the processing of steps S110 and S114, the CPU 104 can perform processing for receiving power feeding data from the power receiving apparatuses 20 (steps S112, S116, S113, and S117) as appropriate. For example, if an unexpected event occurs in a power receiving apparatus 20, the image forming apparatus 10 can stop power feeding according to a request from the power receiving apparatus 20.

Figure 5:
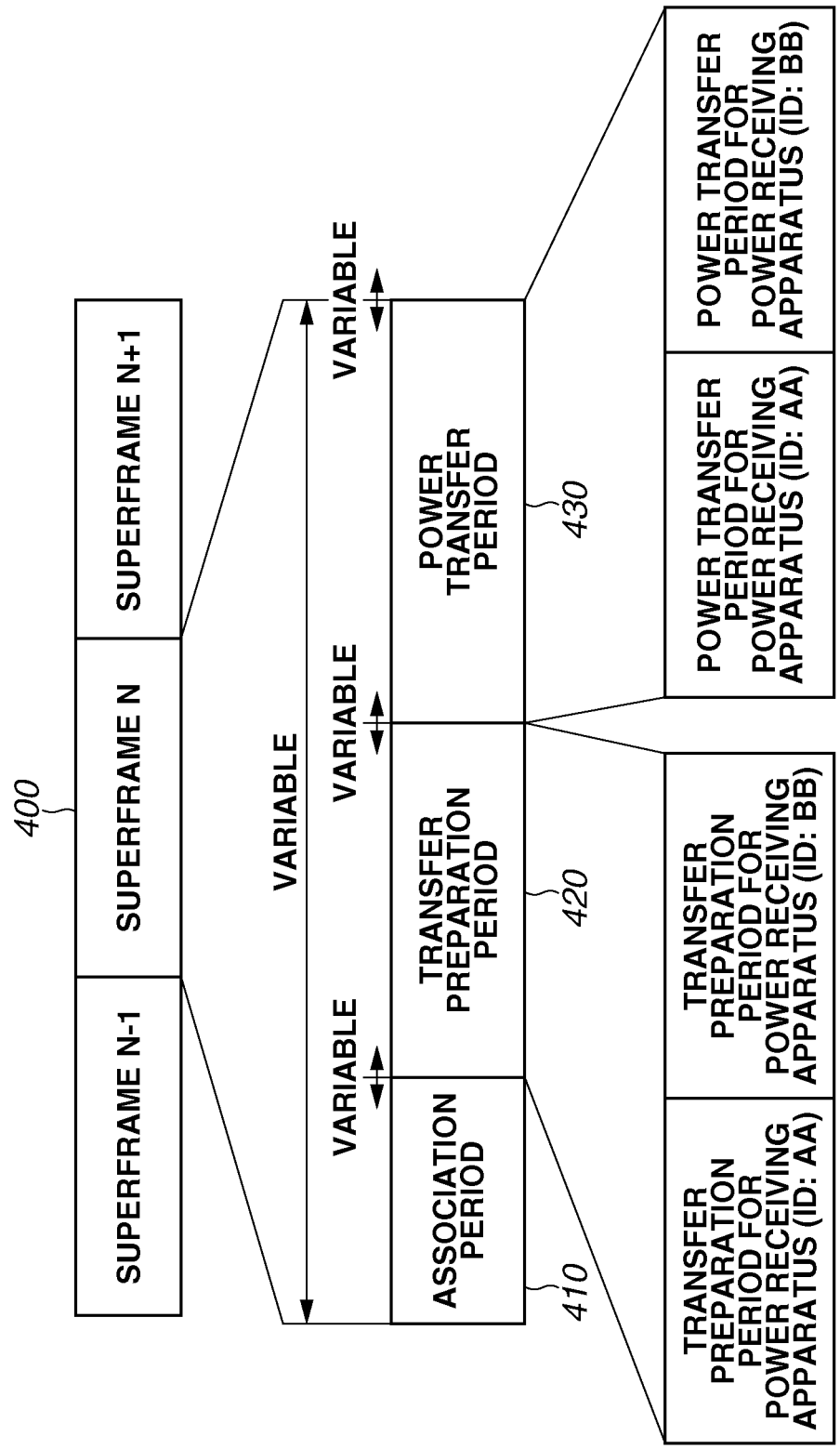
FIG. 5 is a diagram illustrating superframes.

FIG. 5 is a diagram illustrating a series of superframes. Each superframe includes the association period (steps S101 to S105), the transfer preparation period (steps S106 to S109), and the power transfer period (steps S110 to S117) described with reference to FIG. 4. A superframe N 400 includes an association period 410, a transfer preparation period 420, and a power transfer period 430. Each superframe has a variable time length.

In the association period 410, the CPU 104 performs the processing of the association period (steps S101 to S105) to receive power receiving apparatus IDs from the power receiving apparatuses 20 requesting power feeding. The processing in the association period 410 will be described below with reference to FIG. 8.

In the transfer preparation period 420, the CPU 104 performs the processing of the transfer preparation period (steps S106 to S109) to receive power receiving apparatus information from the power receiving apparatuses 20 requesting power feeding. If a plurality of power receiving apparatuses 20 is requesting power feeding, the CPU 104 receives power receiving apparatus information from each of the power receiving apparatuses 20. The processing in the transfer preparation period 420 will be described below with reference to FIG. 9.

In the power transfer period 430, the CPU 104 performs the processing of the power transfer period (steps S110 to S117) to feed power to the power receiving apparatuses 20 requesting power feeding. The processing in the power transfer period 430 will be described below with reference to FIG. 11.

The superframe N 400 illustrated in FIG. 5 is a superframe for the case where the two power receiving apparatuses 20 having the respective power receiving apparatus IDs of "AA" and "BB" request power feeding. In the transfer preparation period 420, the image forming apparatus 10 performs transfer preparation processing with each of the two power receiving apparatuses 20 having the respective power receiving apparatus IDs of "AA" and "BB". In the power transfer period 430, the image forming apparatus 10 performs power transfer processing on each of the two power receiving apparatuses 20 having the respective power receiving apparatus IDs of "AA" and "BB".

In the example illustrated in FIG. 5, in the power transfer period 430, the image forming apparatus 10 initially performs the power transfer processing on the power receiving apparatus 20 having the power receiving apparatus ID of "AA". The image forming apparatus 10 then performs the power transfer processing on the power receiving apparatus 20 having the power receiving apparatus ID of "BB". In such a manner, the image forming apparatus 10 according to the present exemplary embodiment can feed power to a plurality of power receiving apparatuses 20 in the power transfer period 430 in one superframe.

Figure 6:
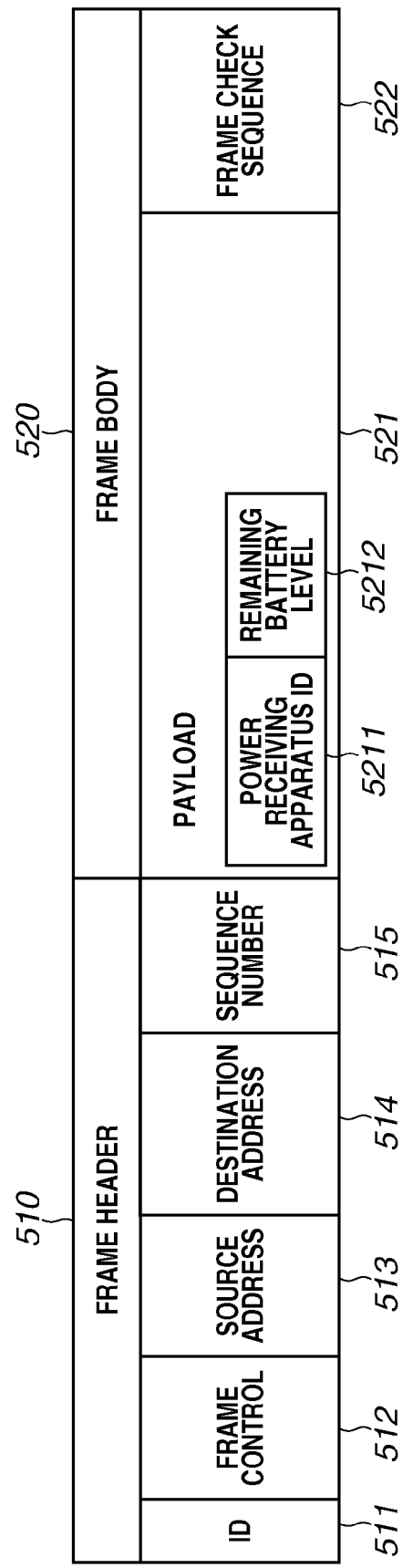
FIG. 6 is a diagram illustrating an example of a frame format.

FIG. 6 is a diagram illustrating an example of a frame format of information to be transmitted and received between the image forming apparatus 10 and a power receiving apparatus 20 during the processing in a superframe. The image forming apparatus 10 and the power receiving apparatus 20 perform data communication in the power feeding processing by using packets in the frame format illustrated in FIG. 6.

A frame header 510 indicates the destination of data transfer. The frame header 510 includes an ID 511, a frame control 512, a source address 513, a destination address 514, and a sequence number 515. The ID 511 is an ID that is used when the image forming apparatus 10 and the power receiving apparatus 20 perform data communication therebetween. The frame control 512 refers to information intended for data exchange between the image forming apparatus 10 and the power receiving apparatus 20. The source address 513 is the source address of the data transfer. The destination address 514 is the destination address of the data transfer. The sequence number 515 is a frame number.

A frame body 520 refers to information about the data body of the data transfer. The frame body 520 includes a payload 521 and a frame check sequence 522. The payload 521 is the data body. The frame check sequence 522 is data for performing an error check on the payload 521.

Various types of information is assigned to the payload 521. For example, a power receiving apparatus ID 5211 and a remaining battery level 5212 are assigned to the payload 521.

The power receiving apparatus ID 5211 is a unique number for identifying the power receiving apparatus 20. The remaining battery level 5212 refers to information indicating the ratio of the remaining battery level to the electrical energy of the secondary battery 270 of the power receiving apparatus 20 at a full charge.

Figure 7:
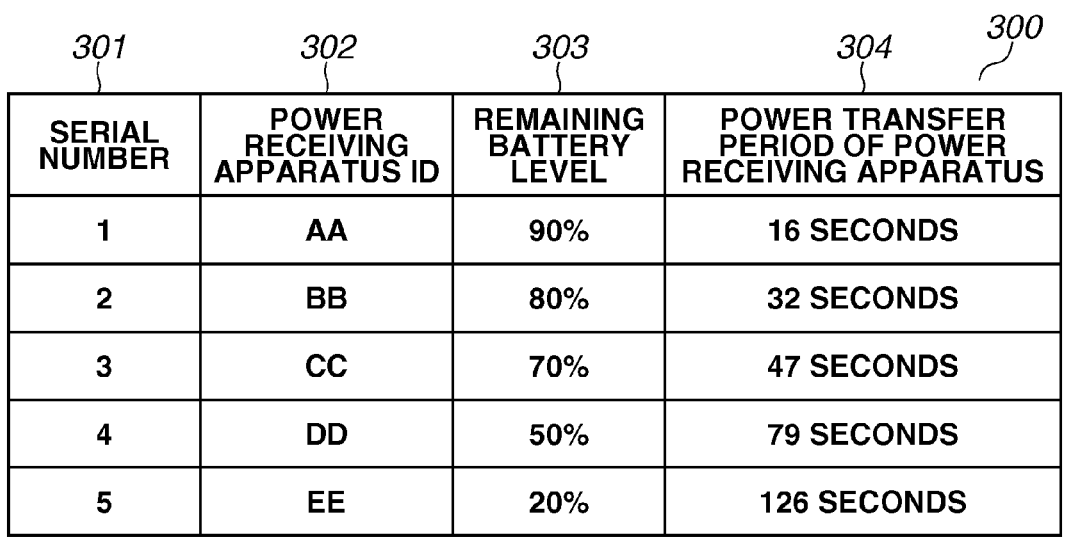
FIG. 7 is a table illustrating an example of a power receiving apparatus information.

FIG. 7 is a table illustrating an example of a data configuration of a power receiving apparatus information table 300. The power receiving apparatus information table 300 is stored in a storage unit of the image forming apparatus 10, such as the RAM 105. The power receiving apparatus information table 300 is generated by the CPU 104 of the image forming apparatus 10. The CPU 104 generates the power receiving apparatus information table 300 based on the power receiving apparatus information received from the power receiving apparatuses 20. Processing for generating the power receiving apparatus information table 300 will be described below.

The power receiving apparatus information table 300 includes a serial number 301, a power receiving apparatus ID 302, a battery remaining level 303, and a power transfer period of power receiving apparatus 304. The power receiving apparatus information table 300 illustrated in FIG. 7 includes five records respectively associated with the serial number 301 of "1" to "5".

The serial number 301 indicates numbers assigned to the respective records in order in which the image forming apparatus 10 has detected the respective power receiving apparatuses 20, i.e., in order of detection. One record includes the serial number 301, the power receiving apparatus ID 302, the remaining battery level 303, and the power transfer period of power receiving apparatus 304 corresponding to one power receiving apparatus ID.

The power receiving apparatus ID 302 indicates numbers unique to the power receiving apparatuses 20. The serial number 301 and the power receiving apparatus ID 302 are stored into the power receiving apparatus information table 300 by the CPU 104 in step S204 in FIG. 8.

The remaining battery level 303 indicates the ratios of the remaining battery levels of the secondary batteries 270 included in the power receiving apparatuses 20 to a full charge. The power transfer period of power receiving apparatus 304 indicates power transfer periods assigned to the respective power receiving apparatuses 20. The remaining battery level 303 is stored into the power receiving apparatus information table 300 by the CPU 104 in step S304 in FIG. 9. The power transfer period of power receiving apparatus 304 is calculated and stored into the power receiving apparatus information table 300 by the CPU 104 in steps S306 and S307 in FIG. 9. Processing by which the CPU 104 determines the power transfer period of power receiving apparatus 304 will be described below.

Figure 8:
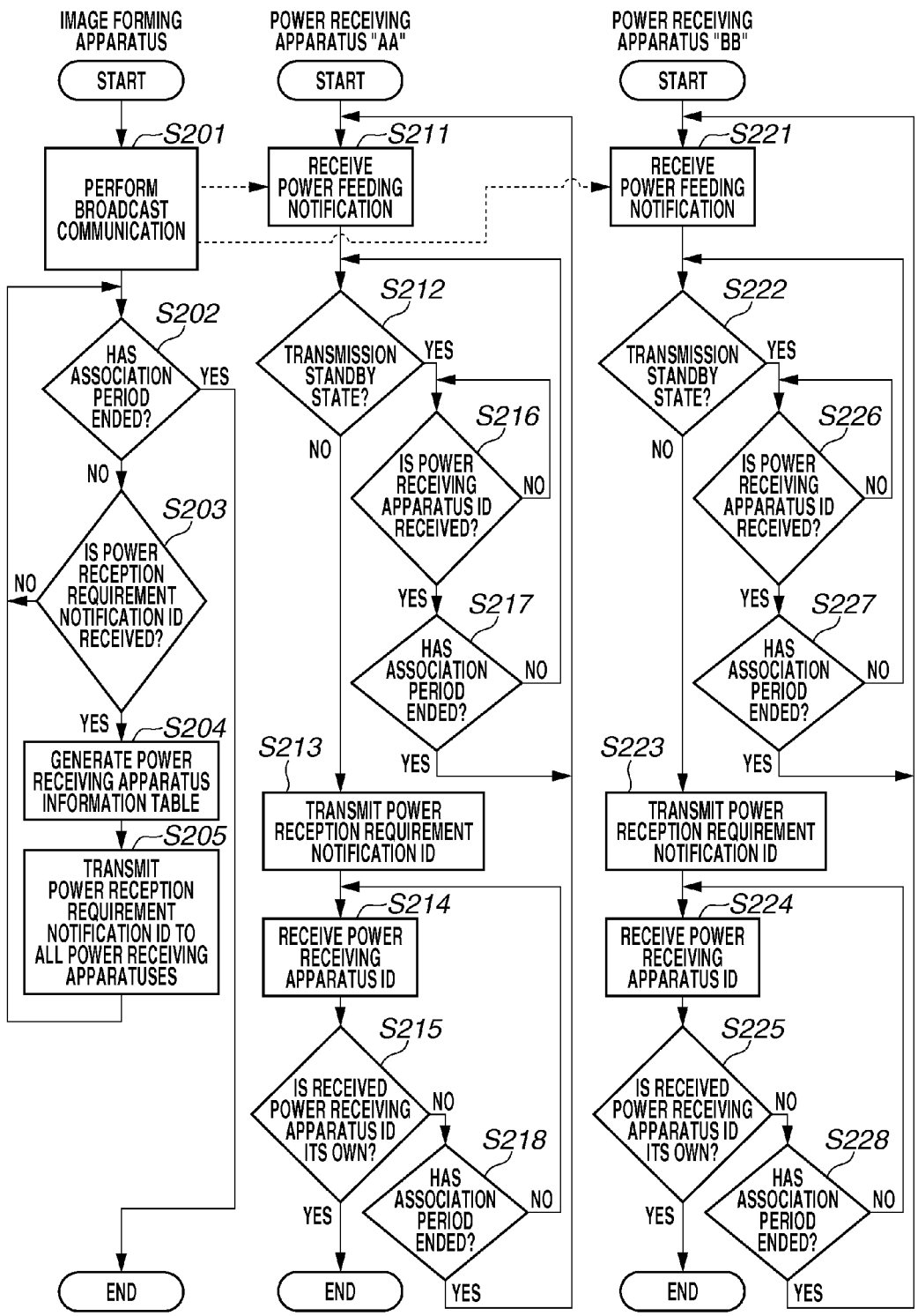
FIG. 8 is a flowchart illustrating processing in an association period.

FIG. 8 is a flowchart illustrating detailed processing in the association period. The processing between the image forming apparatus 10 and the two power receiving apparatuses 20 having the respective power receiving IDs of "AA" and "BB" will be described with reference to FIG. 8. In step S201, the CPU 104 of the image forming apparatus 10 performs broadcast communication to notify the power receiving apparatuses 20 of a start of power feeding via the wireless transmission and reception unit 101. In step S202, the CPU 104 determines whether the association period has ended.

In step S202, if the CPU 104 determines that the association period has not ended (NO in step S202), the processing proceeds to step S203. In step S202, if the CPU 104 determines that the association period has ended (YES in step S202), the processing ends. In step S203, the CPU 104 determines whether a power reception requirement notification ID is received from a power receiving apparatus 20. The power reception requirement notification ID refers to information including that the power receiving apparatus 20 requires to receive power and the power receiving apparatus ID of the power receiving apparatus 20 requiring to receive power.

In step S203, if the CPU 104 determines that a power reception requirement notification ID is not received from a power receiving apparatus 20 (NO in step S203), the processing proceeds to step S202. In step S203, if the CPU 104 determines that a power reception requirement notification ID is received from a power receiving apparatus 20 (YES in step S203), the processing proceeds to step S204.

In step S204, the CPU 104 generates the power receiving apparatus information table 300 based on the power reception requirement notification ID received from the power receiving apparatus 20 in step S203. The CPU 104 stores the generated power receiving apparatus information table 300 in the RAM 105. More specifically, the CPU 104 stores a new serial number 301 in the power receiving apparatus information table 300, and stores the power receiving apparatus ID indicated by the power reception requirement notification ID into the power receiving apparatus ID 302 in association with the new serial number 301.

In step S205, the CPU 104 transmits the power reception requirement notification ID received in step S203 to all the power receiving apparatuses 20 that the CPU 104 can communicate with via the wireless transmission and reception unit 101. The processing then proceeds to step S202. The communication between the image forming apparatus 10 and the power receiving apparatuses 20 is ended when the processing of step S205 ends. In such a manner, the other power receiving apparatuses 20 can communicate with the image forming apparatus 10.

The processing of the power receiving apparatus 20 having the power receiving apparatus ID of "AA" in the association period will be described. In step S211, the CPU 210 of the power receiving apparatus 20 receives a power feeding notification from the image forming apparatus 10. In step S212, the CPU 210 determines whether the power receiving apparatus 20 is in a transmission standby state. More specifically, the CPU 210 determines whether the image forming apparatus 10 and another power receiving apparatus 20 are communicating with each other.

In step S212, if the CPU 210 determines that the power receiving apparatus 20 is in the transmission standby state (YES in step S212), the processing proceeds to step S216. In step S212, if the CPU 210 determines that the power receiving apparatus 20 is not in the transmission standby state (NO in step S212), the processing proceeds to step S213.

In step S212, it is supposed that the power receiving apparatus 20 having the power receiving apparatus ID of "AA" is communicating with the image forming apparatus 10. In such a case, the power receiving apparatuses 20 other than the power receiving apparatus 20 having the power receiving apparatus ID of "AA" are in the transmission standby state. More specifically, the power receiving apparatus 20 having the power receiving apparatus ID of "BB" is in the transmission standby state. The power receiving apparatus 20 having the power receiving apparatus ID of "BB" can communicate with the image forming apparatus when the communication between the power receiving apparatus 20 having the power receiving apparatus ID of "AA" and the image forming apparatus 10 ends, provided that no other power receiving apparatus 20 is communicating with the image forming apparatus 10.

In step S213, the CPU 210 transmits information that power reception is required and a power reception requirement notification ID including its own power receiving apparatus ID to the image forming apparatus 10. In step S203, the image forming apparatus 10 receives the power reception requirement notification ID. In step S214, the CPU 210 receives a power receiving apparatus ID from the image forming apparatus 10. The power receiving apparatus ID is the one transmitted by the image forming apparatus 10 in step S205.

In step S215, the CPU 210 determines whether the power receiving apparatus ID received in step S214 is its own power receiving apparatus ID. In step S215, if the CPU 210 determines that the received power receiving apparatus ID is its own power receiving apparatus ID (YES in step S215), the processing ends. In step S215, if the CPU 210 determines that the received power receiving apparatus ID is not its own power receiving apparatus ID (NO in step S215), the processing proceeds to step S218.

In step S218, if the association period has ended (YES in step S218), the processing proceeds to step S211. In other words, the power receiving apparatus 20 enters a state for waiting to receive broadcast from the image forming apparatus 10. In step S218, if the association period has not ended (NO in step S218), the processing proceeds to step S214.

In step S216, the CPU 210 determines whether a power receiving apparatus ID is received from the image forming apparatus 10. The power receiving apparatus ID is the one transmitted by the image forming apparatus 10 in step S205. The power receiving apparatus ID is that of a power receiving apparatus 20 requiring to receive power. In step S216, if the CPU 210 determines that a power receiving apparatus ID is received (YES in step S216), the processing proceeds to step S217. In step S216, if the CPU 210 determines that no power receiving apparatus ID is received (NO in step S216), the CPU 210 performs the processing of step S216 until a power receiving apparatus ID is received.

In step S217, the CPU 210 determines whether the association period has ended. In step S217, if the CPU 210 determines that the association period has ended (YES in step S217), the processing proceeds to step S211.

In step S217, if the CPU 210 determines that the association period has not ended (NO in step S217), the processing proceeds to step S212. That is, the CPU 210 performs processing for checking whether the image forming apparatus 10 is communicating with any other power receiving apparatus 20. If the own power receiving apparatus 20 is not in the transmission standby state, the CPU 210 transmits its own power reception requirement notification ID. In such a manner, the processing in the association period is completed.

The processing (steps S221 to S228) of the power receiving apparatus 20 having the power receiving apparatus ID of "BB" in the association period is similar to the processing (steps S211 to S218) of the power receiving apparatus 20 having the power receiving apparatus ID of "AA" in the association period.

Figure 9:
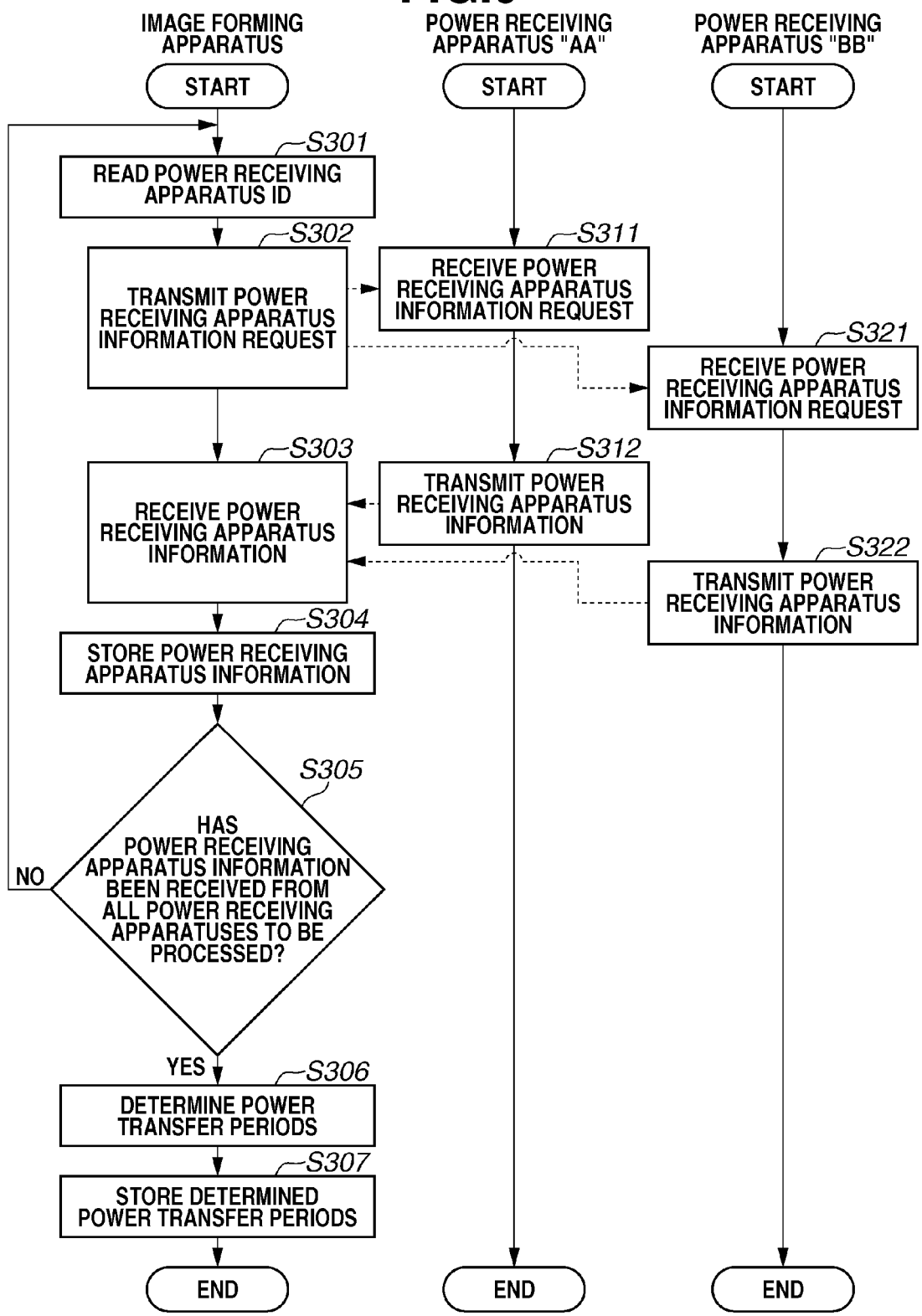
FIG. 9 is a flowchart illustrating processing in a transfer preparation period.

FIG. 9 is a flowchart illustrating detailed processing in the transfer preparation period. In step S301, the CPU 104 of the image forming apparatus 10 reads a power receiving apparatus ID 302 from the power receiving apparatus information table 300 stored in the RAM 105. More specifically, the CPU 104 reads a power receiving apparatus ID 302 for which neither the remaining battery level 303 nor the power transfer period of power receiving apparatus 304 is stored in the power receiving apparatus information table 300.

In step S302, the CPU 104 transmits a power receiving apparatus information request including the read power receiving apparatus ID from the wireless transmission and reception unit 101 to a power receiving apparatus 20. At that time, the power receiving apparatus information request is transmitted only to the power receiving apparatus 20 identified by the power receiving apparatus ID. For example, a power receiving apparatus information request to the power receiving apparatus 20 having the power receiving apparatus ID of "AA" is transmitted to the power receiving apparatus 20 having the power receiving apparatus ID of "AA".

In step S302, the CPU 104 transmits a power receiving apparatus information request including the power receiving apparatus ID of "AA" to the power receiving apparatus 20 having the power receiving apparatus ID of "AA" via the wireless transmission and reception unit 101. In step S311, the power receiving apparatus 20 having the power receiving apparatus ID of "AA" receives the power receiving apparatus information request.

Similarly, in step S302, the CPU 104 of the image forming apparatus 10 transmits a power receiving apparatus information request including the power receiving apparatus ID of "BB" to the power receiving apparatus 20 having the power receiving apparatus ID of "BB". In step S321, the power receiving apparatus 20 having the power receiving apparatus ID of "BB" receives the power receiving apparatus information request.

The power receiving apparatus 20 having the power receiving apparatus ID of "BB" receives the power receiving apparatus information request after the end of the communication between the image forming apparatus 10 and the power receiving apparatus 20 having the power receiving apparatus ID of "AA". In such a manner, in the transfer preparation period, the image forming apparatus 10 communicates in sequence with each of the power receiving apparatuses 20.

In step S311, the power receiving apparatus 20 having the power receiving apparatus ID of "AA" receives the power receiving apparatus information request. In step S312, the power receiving apparatus 20 having the power receiving apparatus ID of "AA" transmits its own power receiving apparatus information to the image forming apparatus 10.

Similarly, in step S321, the power receiving apparatus 20 having the power receiving apparatus ID of "BB" receives the power receiving apparatus information request from the image forming apparatus 10. In step S322, the power receiving apparatus 20 having the power receiving apparatus ID of "BB" transmits its own power receiving apparatus information to the image forming apparatus 10. In such a manner, the processing of the power receiving apparatuses 20 in the transfer preparation period ends.

In step S303, the CPU 104 of the image forming apparatus 10 receives the power receiving apparatus information from the power receiving apparatuses 20 to which the power receiving apparatus information requests have been transmitted, via the wireless transmission and reception unit 101. In the example illustrated in FIG. 9, in step S303, the CPU 101 receives power receiving apparatus information including a remaining battery level from the power receiving apparatus 20 having the power receiving apparatus ID of "AA" and the power receiving apparatus 20 having the power receiving apparatus ID of "BB". The processing performed in step S303 is an example of remaining battery level reception processing.

In step S304, the CPU 104 of the image forming apparatus 10 stores the power receiving apparatus information received from the power receiving apparatuses 20 into the RAM 105. More specifically, the CPU 104 stores the remaining battery levels included in the power receiving apparatus information into the power receiving apparatus information table 300 illustrated in FIG. 7 in association with the power receiving apparatus IDs of the power receiving apparatuses 20 having transmitted the power receiving apparatus information.

In step S305, the CPU 104 determines whether the power receiving apparatus information has been received from all the power receiving apparatuses 20 that have transmitted the power reception requirement notification IDs, i.e., from all the power receiving apparatuses 20 to be processed. In step S305, if the CPU 104 determines that the power receiving apparatus information has been received from all the power receiving apparatuses 20 to be processed (YES in step S305), the processing proceeds to step S306. In step S305, if the CPU 104 determines that there is a power receiving apparatus 20 from which power receiving apparatus information has not been received (NO in step S305), the processing proceeds to step S301.

In step S306, the CPU 104 determines the power transfer periods of the power receiving apparatuses 20 to be processed based on the remaining battery levels received in step S303. More specifically, the CPU 104 determines power feeding time so that as the remaining battery level is higher, i.e., the ratio of the remaining battery level is higher, the power feeding time becomes shorter. The power transfer periods of the power receiving apparatuses 20 to be processed are an example of the power feeding time. The processing of step S306 is an example of power feeding time determination processing.

In step S307, the CPU 104 stores the determined power transfer periods in the field of the power transfer period of power receiving apparatus 304 in association with the power receiving apparatus ID 302 of the power receiving apparatus information table 300.

Power transmission period determination processing in step S306 will be described. The CPU 104 determines the power transfer period of each power receiving apparatus 20 based on the time of the entire power transfer period in a superframe and the remaining battery levels (the ratios of the remaining levels) of the power receiving apparatuses 20, by using Eq. (1):

Power transfer period of power receiving apparatus=
(100−remaining battery level of power receiving apparatus)/Σ(100−remaining battery level)×
power transfer period.   Eq. (1)

The time of the entire power transfer period in a superframe is previously set in the RAM 105 according to an instruction from the user. Processing for setting the time of the entire power transfer period in a superframe will be described below.

For example, based on the remaining battery level 303 of the power receiving apparatuses 20 having the serial numbers of 1 to 5 illustrated in FIG. 7, the CPU 104 determines the power transfer period of the power receiving apparatus 20 having the power receiving apparatus ID of "CC" to be 47 seconds by Eq. (2):

$$(100-70)/\{(100-90)+(100-80)+(100-70)+(100-50)+(100-20)\} \times 300 = 47, \quad \text{Eq. (2)}$$

where the time of the entire power transfer period in a superframe is set to 300 seconds.

Through the above processing, the CPU 104 of the image forming apparatus 10 completes the power receiving apparatus information table 300. The CPU 104 then generates a power feeding order table from the power receiving apparatus information table 300. More specifically, the CPU 104 generates the power feeding order table by sorting the power receiving apparatus IDs of the power receiving apparatuses 20 and the corresponding pieces of information stored in the power receiving apparatus information table 300 in order of power feeding.

Figure 10:
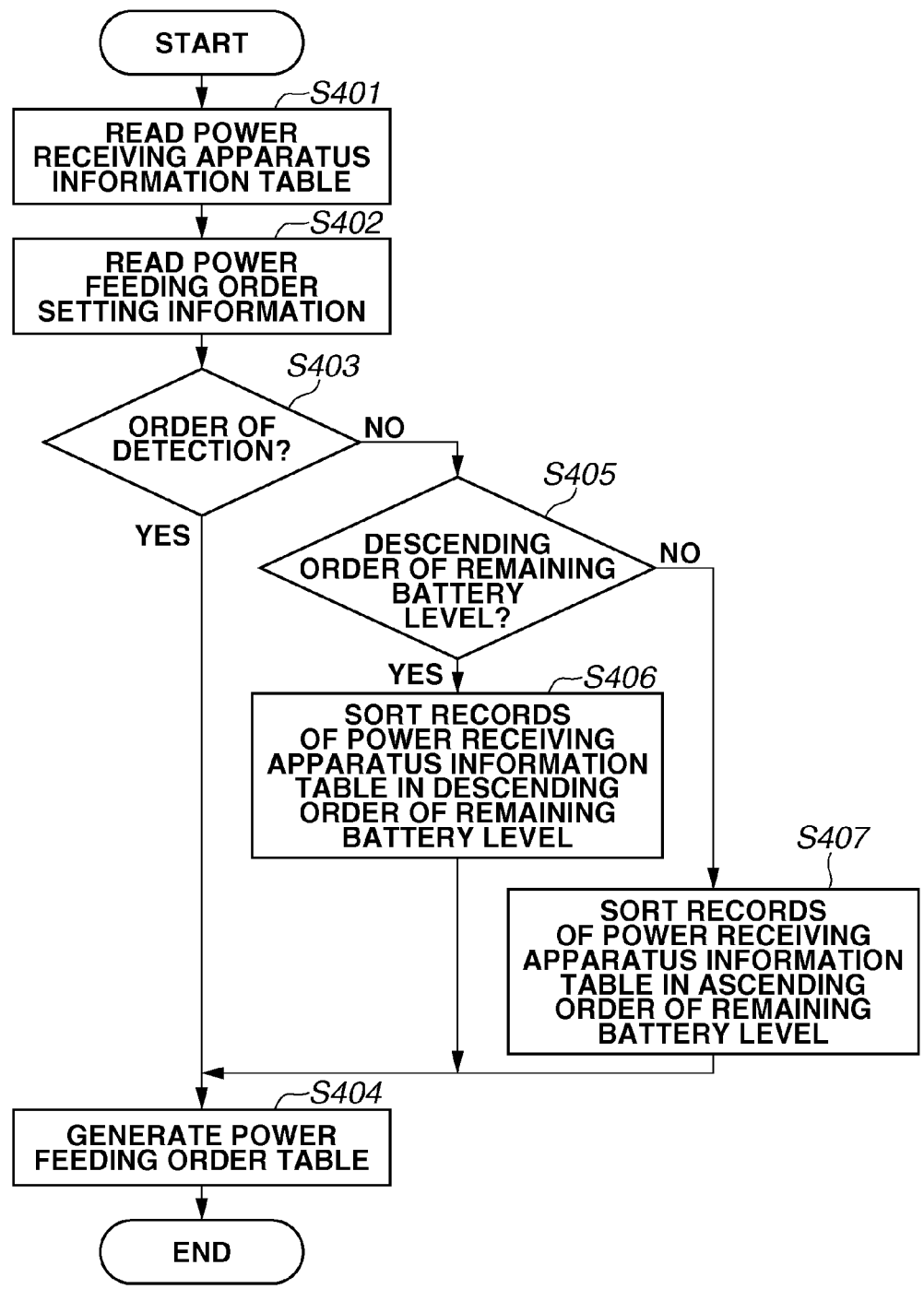
FIG. 10 is a flowchart illustrating power feeding order table generation processing.

FIG. 10 is a flowchart illustrating power feeding order table generation processing by the image forming apparatus 10. The power feeding order table is to be referred to by the CPU 104 of the image forming apparatus 10 in the processing in the power transfer period, which will be described with reference to FIG. 11. In step S401, the CPU 104 reads the power receiving apparatus information table 300 stored in the RAM 105. In step S402, the CPU 104 reads power feeding order setting information stored in the RAM 105. The power feeding order setting information is information indicating a condition for determining the order of power feeding. Possible conditions include three conditions of order of detection, descending order of the remaining battery level (ratio), and ascending order of the remaining battery level (ratio). The condition is previously set by the user and registered in the RAM 105. Processing for registering the power feeding order setting information will be described below.

In step S403, the CPU 104 identifies the condition of the power feeding order setting information read in step S402. In step S403, if the condition is determined to be the order of detection (YES in step S403), then in step S404, the CPU 104 generates the same table as the power receiving apparatus information table 300 as the power feeding order table.

In step S403, if the condition is not determined to be the order of detection, i.e., the condition is determined to be the descending or ascending order of the remaining battery level (NO in step S403), the processing proceeds to step S405.

In step S405, if the CPU 104 determines that the condition is the descending order of the remaining battery level (YES in step S405), the processing proceeds to step S406. In step S405, if the CPU 104 determines that the condition is not the descending order of the remaining battery level (NO in step S405), i.e., if the condition is determined to be the ascending order of the remaining battery level, the processing proceeds to step S407.

In step S406, the CPU 104 sorts the records stored in the power receiving apparatus information table 300 so that the remaining battery levels shown in the records are sorted in descending order. One record of the power receiving apparatus information table 300 includes the power receiving apparatus ID 302, the remaining battery level 303, and the power transfer period of power receiving apparatus 304 for one power receiving apparatus 20.

In step S407, the CPU 104 sorts the records stored in the power receiving apparatus information table 300 so that the remaining battery levels shown in the records are sorted in ascending order. After the processing of step S406 or S407, in step S404, the CPU 104 generates the sorted power receiving apparatus information table 300 as the power feeding order table.

Through the above processing, if the condition of the descending or ascending order of the remaining battery level is set, the CPU 104 generates the power feeding order table by sorting the records of the power receiving apparatus information table 300.

Figure 11:
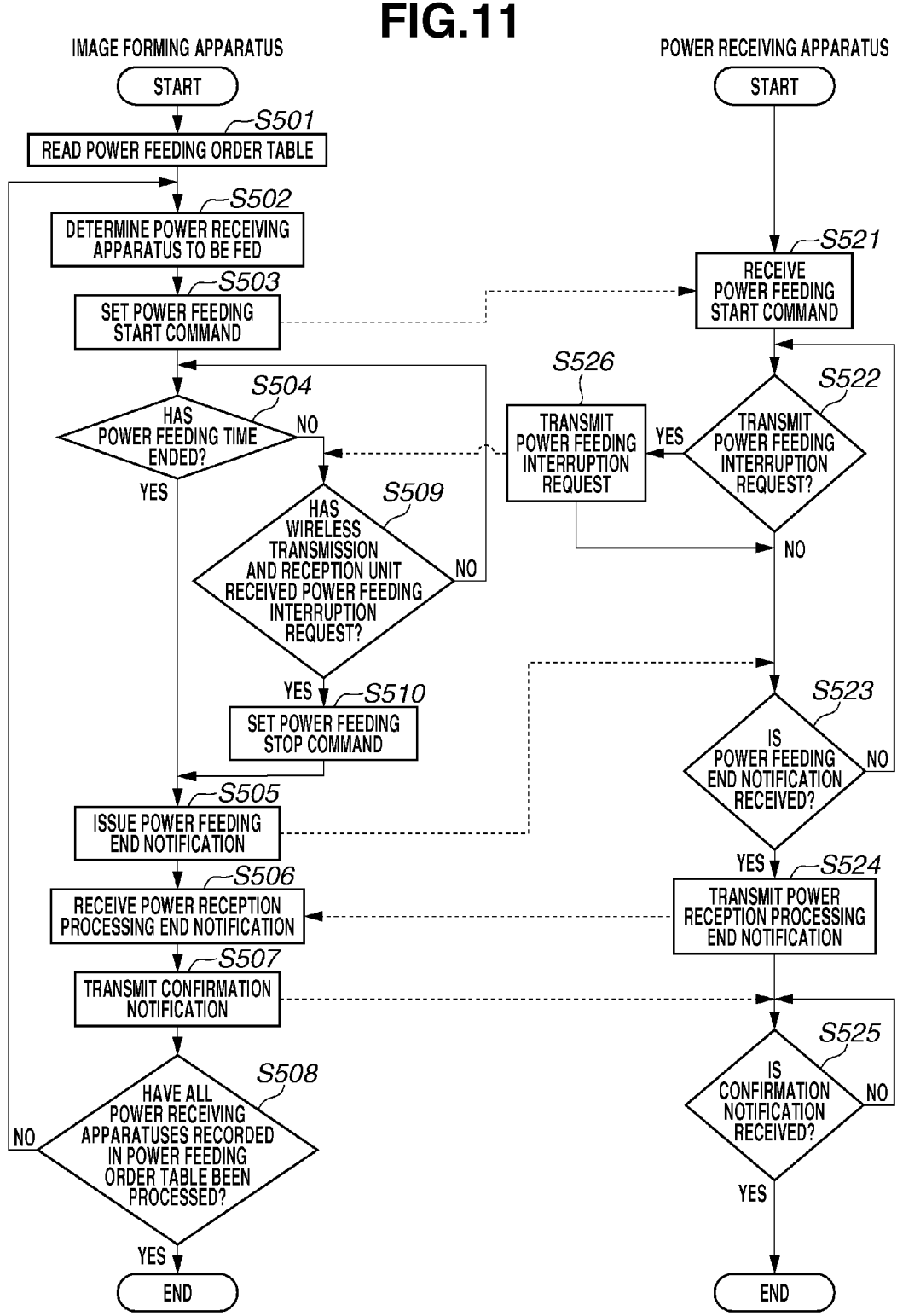
FIG. 11 is a flowchart illustrating processing in a power transfer period.

FIG. 11 is a flowchart illustrating detailed processing in the power transfer period. In step S501, the CPU 104 reads the power feeding order table stored in the RAM 105. In step S502, the CPU 104 determines the power receiving apparatus 20 to be fed power based on the power feeding order table. More specifically, the CPU 104 determines that a power receiving apparatus 20 identified by a corresponding power receiving apparatus ID 302 in ascending order of the serial number 301 in the power feeding order table is the one to be fed power.

In step S503, the CPU 104 sets a power feeding start command into the wireless transmission and reception unit 101. The power feeding start command includes the power receiving apparatus ID and the power feeding time (power transfer period of power receiving apparatus 304) of the power receiving apparatus 20 determined in step S502. The wireless transmission and reception unit 101 transmits the power feeding start command to the power receiving apparatus 20 identified by the power receiving apparatus ID included in the power feeding start command. The CPU 104 further sets the power feeding time into the wireless power feeding unit 102 and issues a power feeding instruction (power feeding control processing). As a result, the wireless power feeding unit 102 performs power feeding (power transfer) in a wireless manner (power feeding processing).

In step S521, the wireless transmission and reception unit 200 of the power receiving apparatus 20 determined to be fed power receives the power feeding start command. The CPU 210 receives the power feeding start command from the wireless transmission and reception unit 200. The CPU 210 issues a power reception instruction to the wireless power receiving unit 230. Upon receiving the power reception instruction, the wireless power receiving unit 230 receives fed power via the power receiving unit antenna 260 and stores the power in the secondary battery 270.

In step S504, the CPU 104 determines whether the power feeding time has ended. In step S504, if the CPU 104 determines that the power feeding time has ended (YES in step S504), the processing proceeds to step S505. In step S504, if the CPU 104 determines that the power feeding time has not ended (NO in step S504), the processing proceeds to step S509. In step S504, the CPU 104 detects the end of the power feeding time based on an interrupt signal from the wireless power feeding unit 102. Upon outputting the interrupt signal to the CPU 104, the wireless power feeding unit 102 ends feeding power from the power feeding unit antenna 114.

In step S522, the CPU 210 of the power receiving apparatus 20 determines whether to transmit a power feeding interruption request to the image forming apparatus 10. For example, the CPU 210 transmits a power feeding instruction request if a predetermined condition is satisfied. The condition for determining whether to transmit a power feeding interruption request is previously set in the power receiving apparatus 20.

In step S522, if the CPU 210 determines not to transmit a power feeding interruption request (NO in step S522), the processing proceeds to step S523. In step S523, the CPU 210 determines whether a power feeding end notification is received. The CPU 210 repeats the processing of steps S522 and S523 until a power feeding end notification is received (while NO in step S523). In step S522, if the CPU 210 determines to transmit a power feeding interruption request (YES in step S522), the processing proceeds to step S526. In step S526, the CPU 210 transmits the power feeding interruption request to the image forming apparatus 10.

In step S509, the CPU 104 of the image forming apparatus 10 determines whether the wireless transmission and reception unit 101 has received a power feeding interruption request from the power receiving apparatus 20. In step S509, if the CPU 104 determines that the wireless transmission and reception unit 101 has received a power feeding interruption request (YES in step S509), the processing proceeds to step S510. In step S509, if the CPU 104 determines that the wireless transmission and reception unit has not received a power feeding interruption request (NO in step S509), the processing proceeds to step S504.

In step S510, the CPU 104 sets a power feeding stop command into the wireless power feeding unit 102 to stop feeding power from the power feeding unit antenna 114. In step S523, the CPU 210 of the power receiving apparatus 20, having transmitted the power feeding interruption request, waits to receive a power feeding end notification. In such a manner, the CPU 104 of the image forming apparatus 10 can stop power feeding as appropriate according to the power feeding interruption request from the power receiving apparatus 20.

In step S505, the CPU 104 issues a power feeding end notification to the power receiving apparatus 20 via the wireless transmission and reception unit 101. In step S523, the CPU 210 of the power receiving apparatus 20 receives the power feeding end notification. The processing proceeds to step S524. In step S524, the CPU 210 of the power receiving apparatus 20 transmits a power reception processing end notification to the image forming apparatus 10 via the wireless transmission and reception unit 200.

In step S506, the CPU 104 of the image forming apparatus 10 receives the power reception processing end notification transmitted from the power receiving apparatus 20 via the wireless transmission and reception unit 101. In step S507, the CPU 104 transmits a confirmation notification of the reception of the power reception processing end notification to the power receiving apparatus 20 via the wireless transmission and reception unit 101. In step S525, the CPU 210 of the power receiving apparatus 20 waits to receive the confirmation notification from the image forming unit 10 (NO in step S525). In step S525, if the confirmation notification is received (YES in step S525), the processing of the CPU 210 in the power transfer period ends.

In step S508, the CPU 104 determines whether all the power receiving apparatuses 20 recorded in the power feeding order table have been processed. In step S508, if the CPU 104 determines that all the power receiving apparatuses 20 have been processed (YES in step S508), the processing in the power transfer period ends. In step S508, if the CPU 104 determines that there is an unprocessed power receiving apparatus 20 (NO in step S508), the processing proceeds to step S502. In step S502, the CPU 104 determines that the unprocessed power receiving apparatus 20 is to be a target of feeding power. The processing proceeds to step S503.

Figure 12:
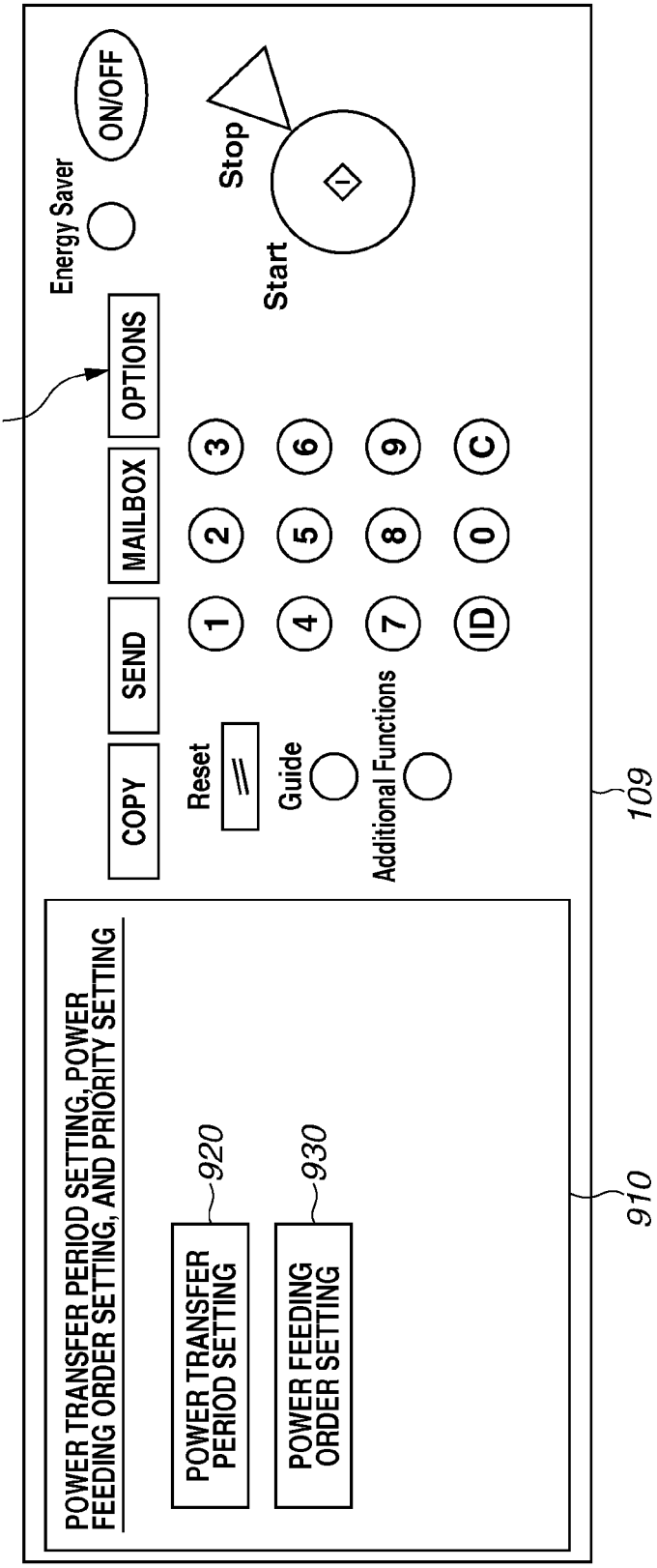
FIG. 12 is a diagram illustrating an example of an acceptance screen.

Processing by which the image forming apparatus 10 sets various types of information based on inputs from the user will be described. FIG. 12 is a diagram illustrating an example of an acceptance screen for accepting various settings from the user. As illustrated in FIG. 12, the operation unit 109 includes a display unit 910. The acceptance screen is displayed on the display unit 910.

The user can select which to set on the acceptance screen, a power transfer period or the order of power feeding. The acceptance screen displays a power transfer period setting button 920 and a power feeding order setting button 930. If the user operates an options button 900, the CPU 104 accepts the operation input and displays the acceptance screen on the display unit 910 according to the input.

Figure 13:
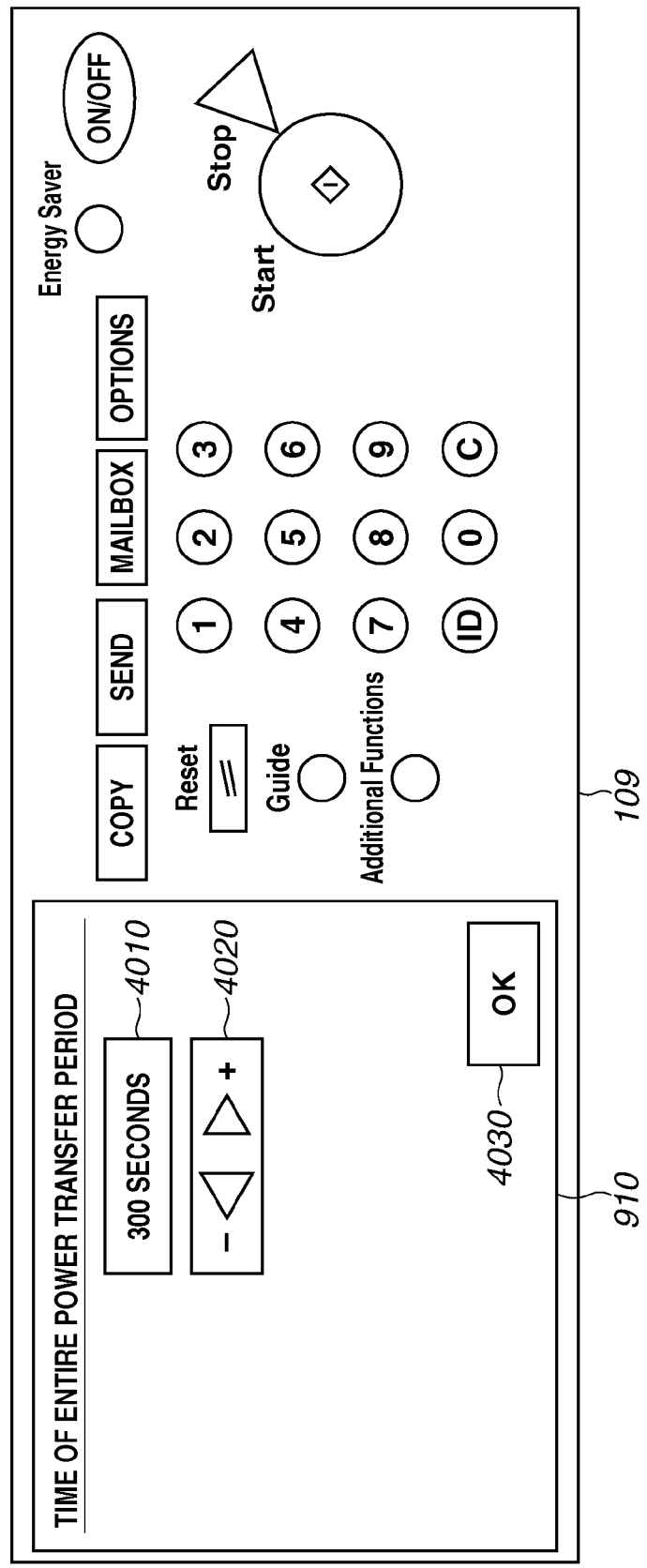
FIG. 13 is a diagram illustrating an example of a time setting screen for an entire power transfer period.

If the CPU 104 determines that the power transfer period setting button 920 is pressed on the acceptance screen, the CPU 104 changes the display of the display unit 910 from the acceptance screen to a time setting screen for the entire power transfer period illustrated in FIG. 13. If the CPU 104 determines that the power feeding order setting button 930 is pressed on the acceptance screen, the CPU 104 changes the display of the display unit 910 from the acceptance screen to a power feeding order setting screen illustrated in FIG. 14.

FIG. 13 is a diagram illustrating an example of the time setting screen for the entire power transfer period, displayed on the display unit 910. The time setting screen for the entire power transfer period is a screen for accepting an input of the time of one entire frame from the user. The time setting screen for the entire power transfer period includes a power transfer time box 4010, time change buttons 4020, an OK button 4030. The power transfer time box 4010 is an entry field for inputting the power transmission period of a frame. In the example illustrated in FIG. 13, 300 seconds are input in the power transfer time box 4010.

The time change buttons 4020 are buttons for changing the value of the power transfer time box 4010. The triangular button on the negative side of the time change buttons 4020 is pressed to reduce the numerical value displayed in the power transfer time box 4010. The triangular button on the positive side of the time change buttons 4020 is pressed to increase the numerical value displayed in the power transfer time box 4010. If the user presses the OK button 4030, the CPU 104 stores the time input in the power transfer time box 4010 into the RAM 105 as the length of the power transfer period of a superframe.

Figure 14:
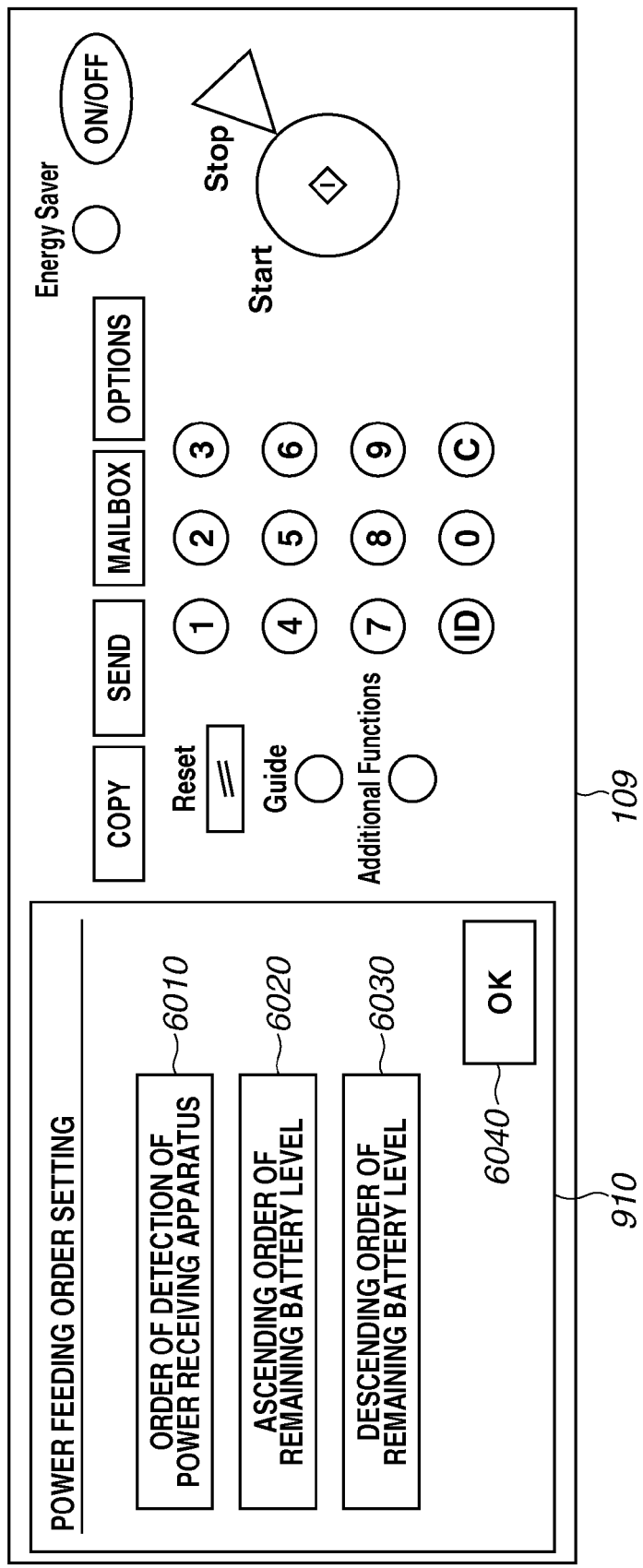
FIG. 14 is a diagram illustrating an example of a power feeding order setting screen.

FIG. 14 is a diagram illustrating an example of the power feeding order setting screen displayed on the display unit 910. The power feeding order setting screen displays an order of detection of power receiving apparatus button 6010, an ascending order of remaining battery level button 6020, a descending order of remaining battery level button 6030, and an OK button 6040. When the user selects any one of the order of detection of power receiving apparatus button 6010, the ascending order of remaining battery level button 6020, and the descending order of remaining battery level button 6030, and presses the OK button 6040, the CPU 104 stores power feeding order setting information corresponding to the selected power feeding order setting into the RAM 105.

If the order of detection of power receiving apparatus button 6010 is pressed, the CPU 104 stores power feeding order setting information about the order of detection into the RAM 105. If the ascending order of remaining battery level button 6020 is pressed, the CPU 104 stores power feeding order setting information about the ascending order of the remaining battery level into the RAM 105. If the descending order of remaining battery level button 6030 is pressed, the CPU 104 stores power feeding order setting information about the descending order of the remaining battery level into the RAM 105.

The power feeding order setting information set from the power feeding order setting screen is referred to in the power feeding order table generation processing described with reference to FIG. 10.

As described above, the wireless power feeding system according to the first exemplary embodiment determines the power transfer period for each power receiving apparatus 20 based on the remaining battery levels of the power receiving apparatuses 20. In such a manner, the wireless power feeding system can appropriately feed power to the power receiving apparatuses 20.

Modifications of the wireless power feeding system according to the first exemplary embodiment will be described. The image forming apparatus 10 according to a first modification may receive remaining battery level information indicating the absolute values of the remaining battery levels of the secondary batteries 270 from the power receiving apparatuses 20 instead of the remaining battery level information indicating the ratios of the remaining battery levels of the secondary batteries 270. In such a case, the image forming apparatus 10 stores in advance the electrical energy of the respective power receiving apparatuses 20 at a full charge. The image forming apparatus 10 can calculate the ratios of the remaining battery levels based on the electrical energy at a full charge and the received remaining battery levels.

In a second modification, the image forming apparatus 10 may determine the power transfer period for each power receiving apparatus 20 based on the absolute values of the remaining battery levels.

A wireless power feeding system according to a second exemplary embodiment will be described. The wireless power feeding system according to the second exemplary embodiment determines the power receiving apparatus 20 to be fed power based on information about the power receiving apparatuses 20.

Figure 15:
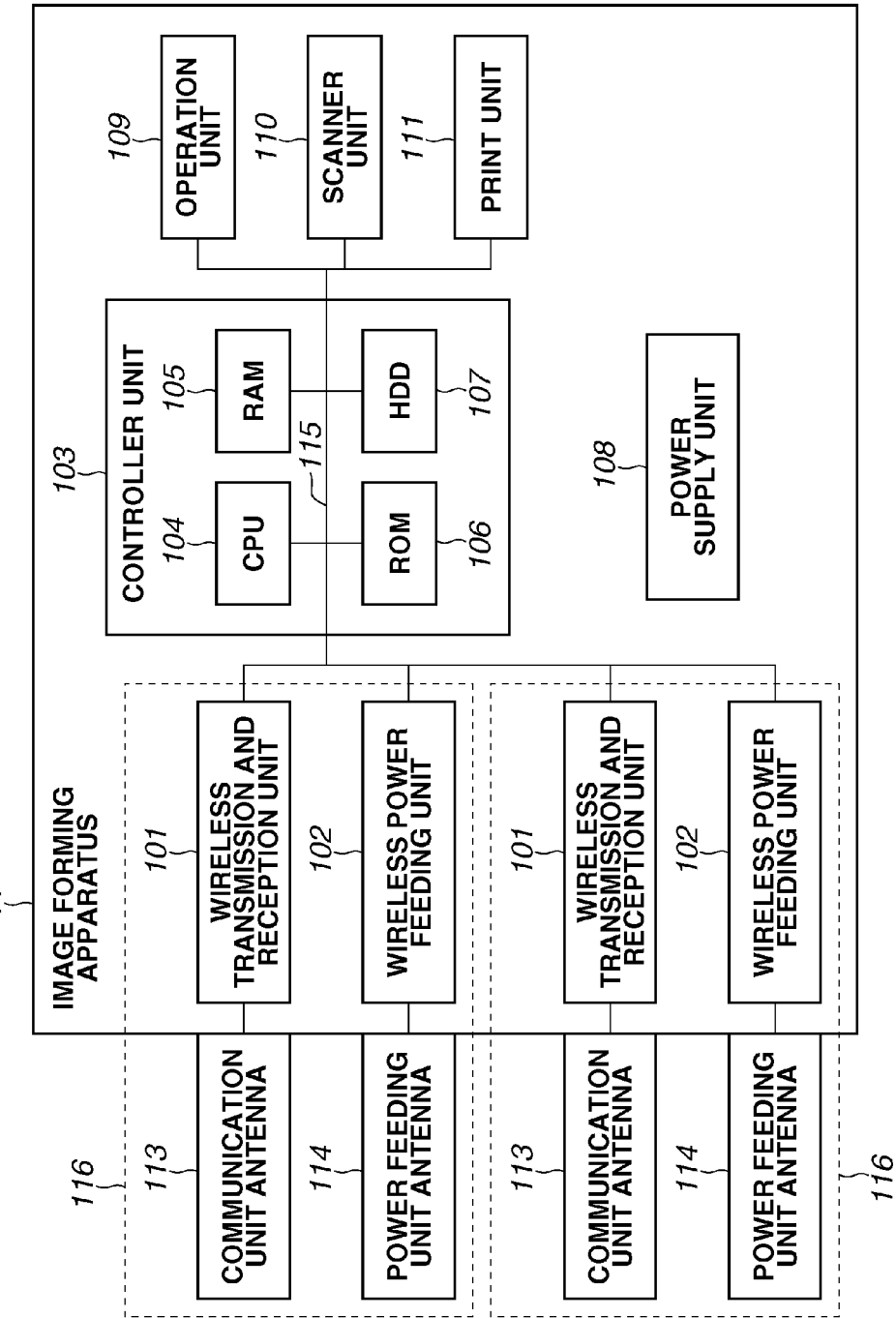
FIG. 15 is a diagram illustrating an image forming apparatus.

FIG. 15 is a diagram illustrating an image forming apparatus 11 according to the second exemplary embodiment. As illustrated in FIG. 15, the image forming apparatus 11 includes two power transfer channels 116. Each power transfer channel 116 includes a wireless transmission and reception unit 101, a wireless power feeding unit 102, a communication unit antenna 113, and a power feeding unit antenna 114.

Figure 16:
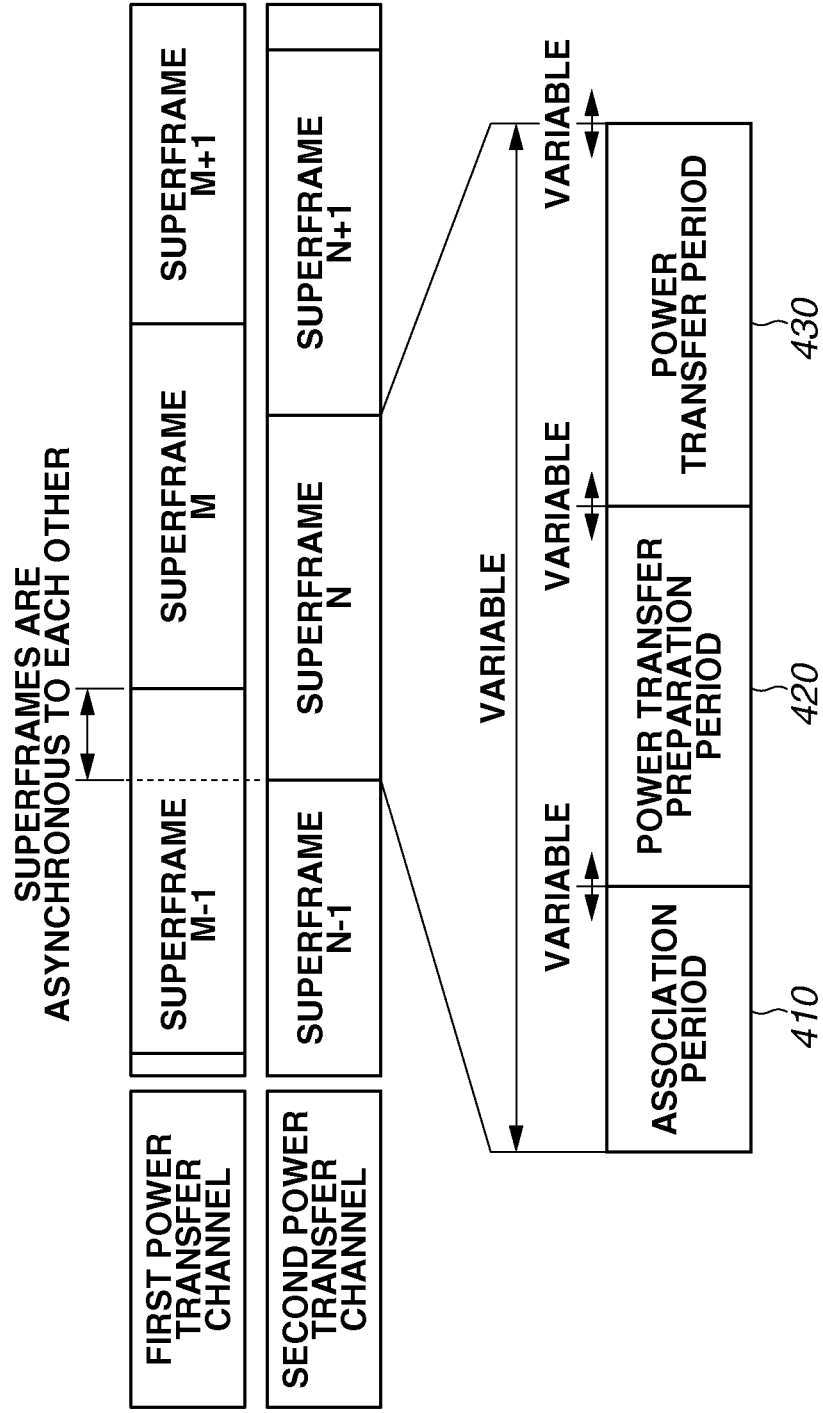
FIG. 16 is a diagram illustrating superframes.

FIG. 16 is a diagram illustrating superframes for two channels. The power transfer channels 116 perform wireless power feeding by repeating respective different superframes. The two power transfer channels 116 perform processing in an asynchronous manner. The CPU 104 therefore need not perform processing for synchronizing the superframes.

Figure 17:
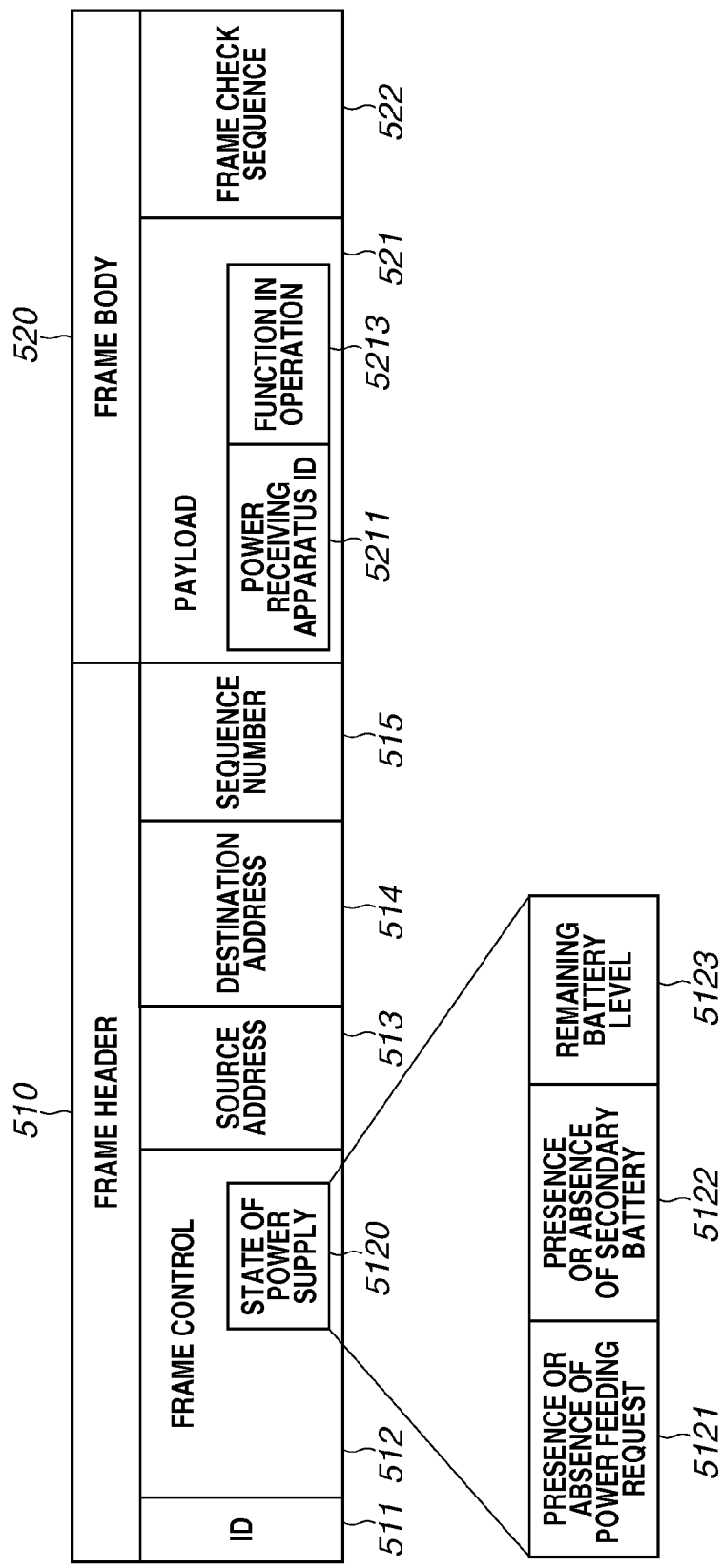
FIG. 17 is a diagram illustrating an example of a frame format.

FIG. 17 is a diagram illustrating an example of a frame format used by the wireless power feeding system according to the second exemplary embodiment. As illustrated in FIG. 17, a frame control 512 of the frame format includes a power supply state 5120. The power supply state 5120 includes a presence or absence of power feeding request 5121, a presence or absence of secondary battery 5122, and a remaining battery level 5123. A payload 521 includes a power receiving apparatus ID 5211 and a function in operation 5213.

The presence or absence of power feeding request 5121 is information indicating whether the power receiving apparatus 20 requests power feeding. The presence or absence of secondary battery 5122 is information indicating whether the power receiving apparatus 20 includes the secondary battery 270. The remaining battery level 5123, as described in the first exemplary embodiment, is information indicating the ratio of the remaining level to the electrical energy of the secondary battery 270 at a full charge.

The function in operation 5213 is information indicating whether each function of the power receiving apparatus 20 is in operation. Examples of the function include a phone call, file download, standby, sleep, printing, image read, and mail.

Figure 18:
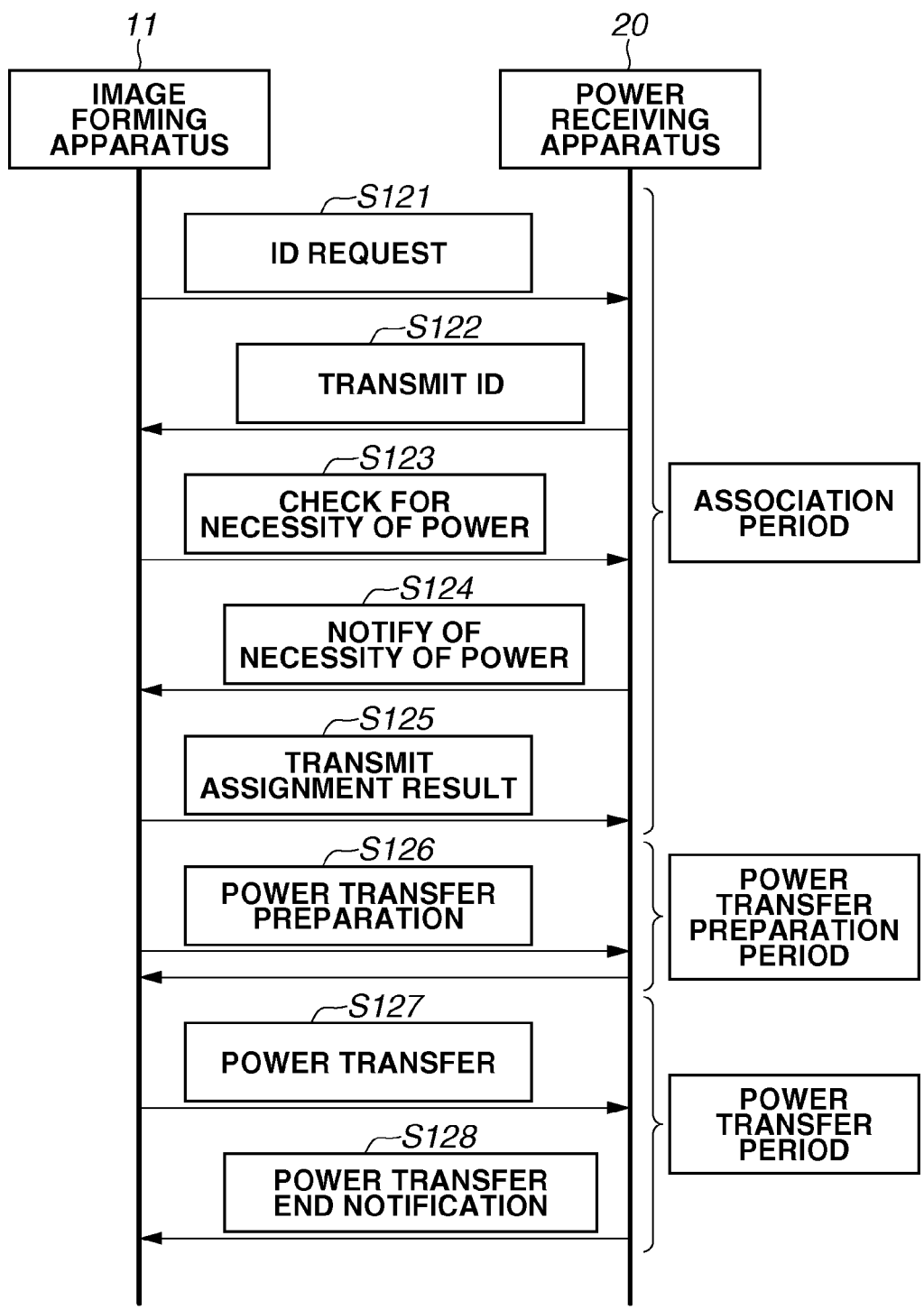
FIG. 18 is a sequence diagram illustrating an overview of power feeding proceeding.

FIG. 18 is a sequence diagram illustrating an overview of power feeding processing by the image forming apparatus 11 and a power receiving apparatus 20 in a superframe according to the wireless power feeding system of the second exemplary embodiment. The image forming apparatus 11 performs the power feeding processing for each of the two power transfer channels 116.

In step S121, the image forming apparatus 11 transmits an ID request (ARQ signal) requesting a power receiving apparatus ID to the power receiving apparatus 20. At that time, the image forming apparatus 11 uses the ID 511 of the frame format. In step S122, the image forming apparatus 11 receives response information (ARS signal) including the power receiving apparatus ID 5211 from the power receiving apparatus 20.

In step S123, the image forming apparatus 11 checks the power receiving apparatus 20 for necessity of power. More specifically, the image forming apparatus 11 generates a power receiving apparatus information request in which information for requesting the presence or absence of power feeding request, the presence or absence of secondary battery, the remaining battery level, and the function in operation is embedded. At that time, the image forming apparatus 11 uses the power supply state 5120 and the function in operation 5213 of the frame format. The image forming apparatus 11 transmits the generated power receiving apparatus information request as a request frame.

In step S124, if the power receiving apparatus 20 needs power, the power receiving apparatus 20 notifies the image forming apparatus 11 of the necessity of power. More specifically, the power receiving apparatus 20 generates power receiving apparatus information by embedding a power reception request, the presence or absence of the secondary battery 270, and remaining battery level information into the presence or absence of power feeding request 5121, the presence or absence of secondary battery 5122, and the remaining battery level 5123, respectively. The power receiving apparatus 20 transmits the generated power receiving apparatus information to the image forming apparatus 11 as a response frame.

If the power receiving apparatus 20 does not need power, the power receiving apparatus 20 generates the power receiving apparatus information by embedding information indicating the non-necessity of power into the power supply state 5120, or leaving the information in the power supply state 5120 blank.

In step S125, the image forming apparatus 11 determines a power receiving apparatus 20 to be fed power based on responses about the necessity of power reception. The image forming apparatus 11 transmits an assignment result indicating that power feeding is assigned thereto to the determined power receiving apparatus 20. In step S126, the image forming apparatus 11 makes preparations for power transfer. In step S127, the image forming apparatus 11 transfers power to the power receiving apparatus 20. In step S128, the power receiving apparatus 20 transmit a power transfer end notification to the image forming apparatus 11 when its secondary battery 270 is fully charged. At that time, the power receiving apparatus 20 uses the power supply state 5120 of the frame format. In such a manner, one superframe ends.

The power feeding processing also ends if the power receiving apparatus 20 and the image forming apparatus 11 cannot communicate for more than a certain time period, or if an event interfering with power feeding occurs in the image forming apparatus 11.

The image forming apparatus 11 and the power receiving apparatuses 20 thus perform data transmission and reception processing within a superframe, thereby achieving data communication for wireless power feeding.

Figure 19:
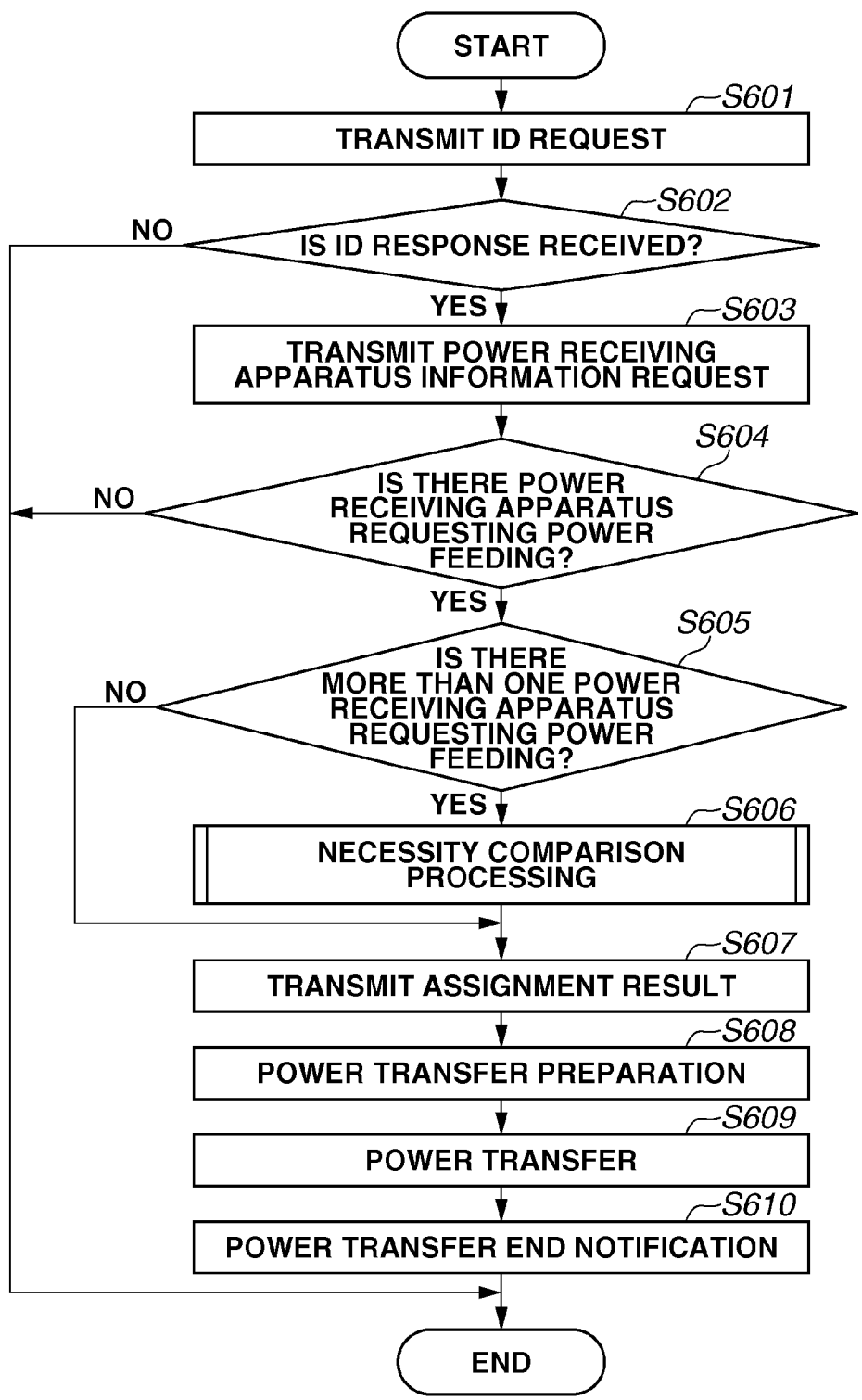
FIG. 19 is a flowchart illustrating the power feeding proceeding.

Detailed processing in the association period will be described below. FIG. 19 is a flowchart illustrating power feeding processing in one power transfer channel 116 of the image forming apparatus 11. The processing of steps S601 to S607 illustrated in FIG. 19 corresponds to that of steps S121 to S125 of the power feeding processing illustrated in FIG. 18. The processing of steps S608, S609, and S610 illustrated in FIG. 19 corresponds to that of steps S126, S127, and S127, respectively.

In step S601, the CPU 104 of the image forming apparatus 11 transmits an ID request from the wireless transmission and reception unit 101. At that time, the CPU 104 uses the ID 511 of the frame format.

In step S602, the CPU 104 waits for an ID response or responses from the power receiving apparatuses 20 in response to the ID request transmitted in step S601 until a timeout period has elapsed. If the CPU 104 has received an ID response or responses (YES in step S602), the CPU 104 stores the ID response(es) in a power receiving apparatus information table in order of reception in association with the ID 511 of the frame format and the power receiving apparatus ID(s) of the power receiving apparatus(es) 20 having transmitted the ID response(es).

FIG. 20 is a diagram illustrating an example of a power receiving apparatus information table 310 according to the second exemplary embodiment. The power receiving apparatus information table 310 stores an ID 311, a power receiving apparatus ID 312, a presence or absence of power feeding request 313, a function in operation 314, a presence or absence of secondary battery 315, and a remaining battery level 316 in association with each other. The CPU 104 stores the ID 311 and the power receiving apparatus ID 312 into the power receiving apparatus information table 310 in the processing of step S602.

Returning to FIG. 19, in step S602, if an ID response is received (YES in step S602), the processing proceeds to step S603. In step S602, if the timeout period has elapsed without receiving an ID response (NO in step S602), the processing ends. After the end of the processing, the CPU 104 may restart step S601 after a lapse of the timeout period or after a lapse of a period shorter or longer than the timeout period.

In step S603, the CPU 104 generates a power receiving apparatus information request, and transmits the generated power receiving apparatus information request to the power receiving apparatus(es) 20 having transmitted the ID response(s). At that time, the CPU 104 uses the power supply state 5120 and the function in operation 5213 of the frame format.

Upon receiving the power receiving apparatus information request, the power receiving apparatus(es) 20 transmits/transmit power receiving apparatus information to the image forming apparatus 11 as a response frame. The power receiving apparatus information includes the presence or absence of a power feeding request, the presence or absence of the secondary battery 270, the remaining battery level, and the function in operation.

In step S604, the CPU 104 of the image forming apparatus 11 receives the power receiving apparatus information from the power receiving apparatus(es) 20. The power receiving apparatus information includes an operating state. The processing in step S604 is an example of operating state reception processing. The CPU 104 stores the power receiving apparatus information in the power receiving apparatus information table 310 in association with the ID 511 of the frame format. The CPU 104 determines whether there is a power receiving apparatus 20 requesting power feeding, based on the presence or absence of power feeding request 5121 received. In step S604, if there is a power receiving apparatus 20 requesting power feeding (YES in step S604), the processing proceeds to step S605. In step S604, if there is no power receiving apparatus 20 requesting power feeding (NO in step S604), the processing ends.

In step S605, the CPU 104 determines whether there is more than one power receiving apparatus 20 requesting power feeding. In step S605, if there is only one power receiving apparatus 20 requesting power feeding (NO in step S605), the processing proceeds to step S607. In step S605, if there is more than one power receiving apparatus 20 requesting power feeding (YES in step S605), the processing proceeds to step S606.

In step S606, the CPU 104 compares power feeding necessity degrees of the plurality of power receiving apparatuses 20 requesting power feeding. The power feeding necessity degree refers to an evaluation value about the degree to which the power receiving apparatus 20 needs power feeding. As the power feeding is needed, the greater the value of the power feeding necessity degree.

Based on the comparison result, the CPU 104 selects a power receiving apparatus 20 having the highest necessity as the power receiving apparatus 20 to be fed power. The processing of step S606 will be described below with reference to FIG. 22.

In step S607, the CPU 104 transmits an assignment result indicating that power feeding is assigned thereto to the selected power receiving apparatus 20. The CPU 104 further notifies the unselected power receiving apparatus(es) 20 that no power will be fed thereto.

In step S608, the CPU 104 performs power transmission preparation. More specifically, the CPU 104 sets various parameters needed for power transfer between the image forming apparatus 10 and the power receiving apparatus 20 to be fed power. Examples of the various parameters needed for power transfer include a frequency band, an antenna, and a resonance frequency.

In step S609, the CPU 104 starts feeding power from the wireless power feeding unit 102 to the power receiving apparatus 20 to be fed power (power feeding processing). In step S610, the image forming apparatus 11 receives a power transfer end notification from the power receiving apparatus 20 and ends the power transfer. The CPU 104 may also end the power transfer if a time set in the power transfer preparation period has elapsed, if communication is disconnected for more than a certain time period, or if an event interfering with power feeding occurs in the image forming apparatus 11.

Figure 21:
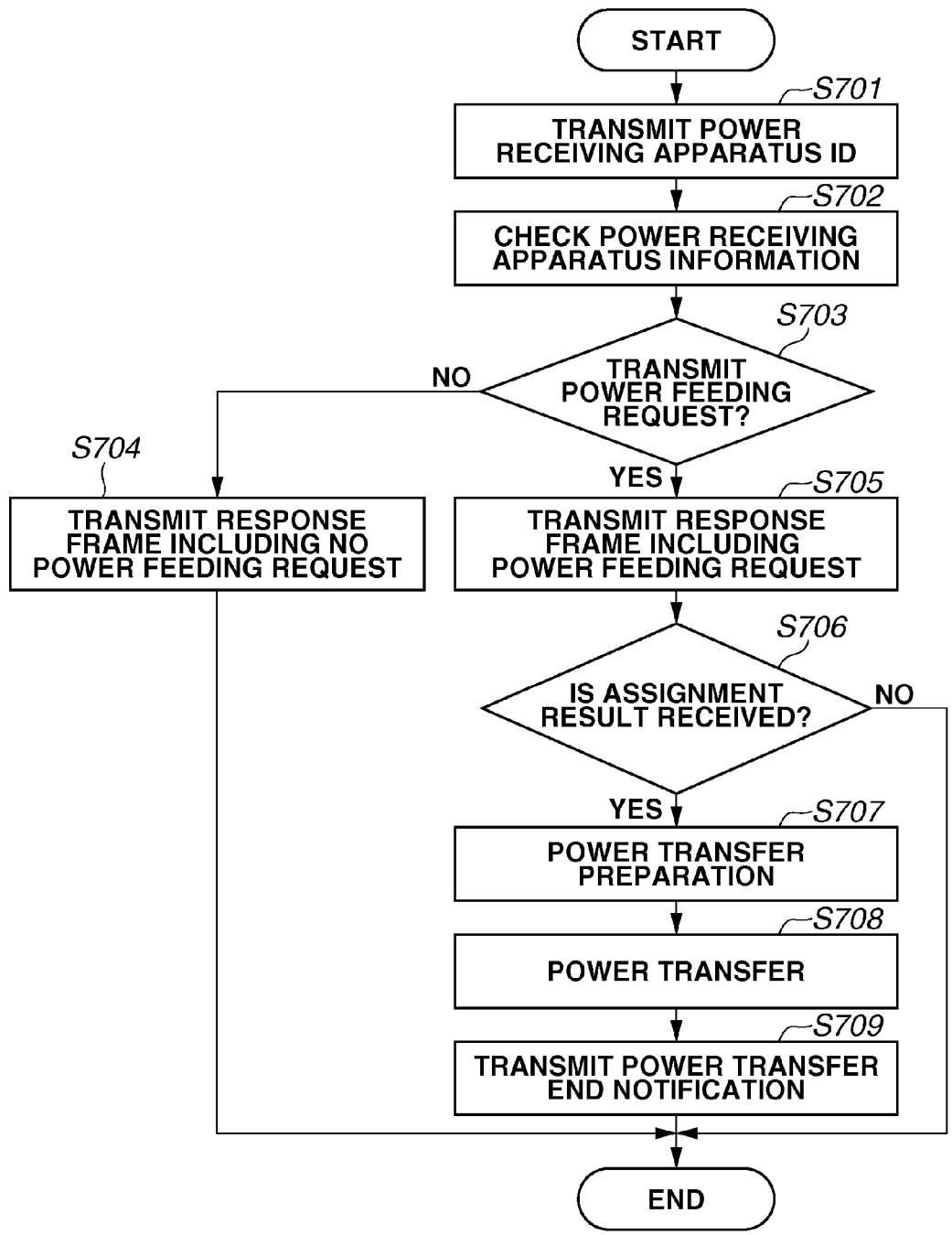
FIG. 21 is a flowchart illustrating power reception processing.

FIG. 21 is a flowchart illustrating power reception processing of a power receiving apparatus 20. The processing of steps S701 to S705 illustrated in FIG. 21 corresponds to that of steps S121 to S125 of the power feeding processing (FIG.

18). The processing of steps S706 to S709 illustrated in FIG. 21 corresponds to that of steps S126 and S127 of the power feeding processing.

In step S701, the CPU 210 of the power receiving apparatus 20 receives an ID request from the image forming apparatus 11 by the wireless transmission and reception unit 200. The CPU 210 transmits the power receiving apparatus ID from the wireless transmission and reception unit 200 to the image forming apparatus 11 by using the power receiving apparatus ID 5211 of the frame format.

In step S702, the CPU 210 checks power receiving apparatus information. In the present exemplary embodiment, the CPU 210 checks the power supply state of the power receiving apparatus 20 and the function in operation. The power supply state refers to the presence or absence of the secondary battery 270 and the remaining battery level of the secondary battery 270. The CPU 210 checks the remaining battery level based on a voltage and/or current of the secondary battery 270. The function in operation refers to a function that is in operation when the processing of step S702 is performed, among the functions of the power receiving apparatus 20.

The CPU 210 encodes the power supply state identified (the presence or absence and the remaining battery level of the secondary battery 270) and stores the resulting code of the power supply state into a power supply state storage unit included in the RAM 220. The CPU 210 further encodes the function in operation identified and stores the resulting code of the function in operation into an in-operation function storage unit included in the RAM 220.

The CPU 210 encodes the power supply state and the function in operation by referring to lookup tables (LUTs). The LUTs are tables that associate states of power supply and functions in operation with respective codes. For example, the LUTs are stored in the ROM 240 in advance.

The power receiving apparatus information may be information from which a necessity evaluation value of each power receiving apparatus 20 can be estimated. The types of the power receiving apparatus information is not limited to those of the exemplary embodiment. Other examples of the power receiving apparatus information may include a memory usage and other function use rates, CPU power, and the name of an application program of the power receiving apparatus 20.

In step S703, the CPU 210 determines whether to transmit a power feeding request, based on the power supply state and the function in operation. More specifically, the CPU 210 determines whether a determination condition is satisfied. The determination condition is set in the ROM 240 in advance. The user can set and modify the determination condition by operating a user interface (UI).

Examples of the determination condition include any one of conditions that a predetermined function is in operation, that the secondary battery 270 is absent, that the secondary battery 270 is present and the remaining battery level of the secondary battery 270 is 50% or less, or combinations of such conditions. The determination conditions are not limited to those of the exemplary embodiment. Other examples of the determination condition may include a power receiving signal level, a temperature of the secondary battery 270, a distance and/or a positional relationship between the power receiving apparatus 20 and the image forming apparatus 11, and combinations of such conditions.

In step S703, if the CPU 210 determines to transmit a power feeding request (YES in step S703), the processing proceeds to step S705. In step S703, if the CPU 210 determines not to transmit a power feeding request (NO in step S703), the processing proceeds to step S704.

In step S704, the CPU 210 generates a response frame including no power feeding request and transmits the response frame to the image forming apparatus 10 in response to a power receiving apparatus information request. More specifically, the CPU 210 embeds information indicating the absence of a power feeding request into the presence or absence of power feeding request 5121 of the frame format. The CPU 210 further embeds the code of the presence or absence of the secondary battery 270, the code of the remaining battery level, and the code of the function in operation into the presence or absence of secondary battery 5122, the remaining battery level 5123, and the function in operation 5213 of the payload 521 in the frame format. Then, the processing ends.

In step S705, the CPU 210 generates a response frame including a power feeding request, and transmits the response frame to the image forming apparatus 10 in response to a power receiving apparatus information request. More specifically, the CPU 210 embeds information indicating the presence of a power feeding request into the presence or absence of power feeding request 5121 of the frame format. The CPU 210 further embeds the respective codes into the presence or absence of secondary battery 5122, the remaining battery level 5123, and the function in operation 5213 of the payload 521.

In step S705, the CPU 210 transmits the response frame indicating the presence of a power feeding request, and the processing proceeds to step S706. In step S706, the CPU 210 waits to receive an assignment result. The assignment result refers to information indicating that the own power receiving apparatus 20 is assigned to the power transfer channel 116, i.e., selected as the power receiving apparatus 20 to be fed power. In step S706, if the CPU 210 receives the assignment result (YES in step S706), the processing proceeds to step S707. In step S706, if the CPU 210 does not receive the assignment result (NO in step S706), the power reception processing ends.

In step S707, the CPU 210 performs power transfer preparation. More specifically, the CPU 210 sets various parameters concerning power transfer between the image forming apparatus 11 and the power receiving apparatus 20. In step S708, the CPU 210 receives power transferred from the image forming apparatus 11 and charges the secondary battery 270.

In step S709, the CPU 210, upon completing charging the secondary battery 270, transmits a power transfer end notification to the image forming apparatus 11, and ends the power transfer. Other than the completion of the charging of the secondary battery 270, the CPU 210 ends the power transfer if a time set in the power transfer preparation period has elapsed, if communication is disconnected for more than a certain time, or if an event interfering with power feeding occurs in the image forming apparatus 11.

Figure 22:
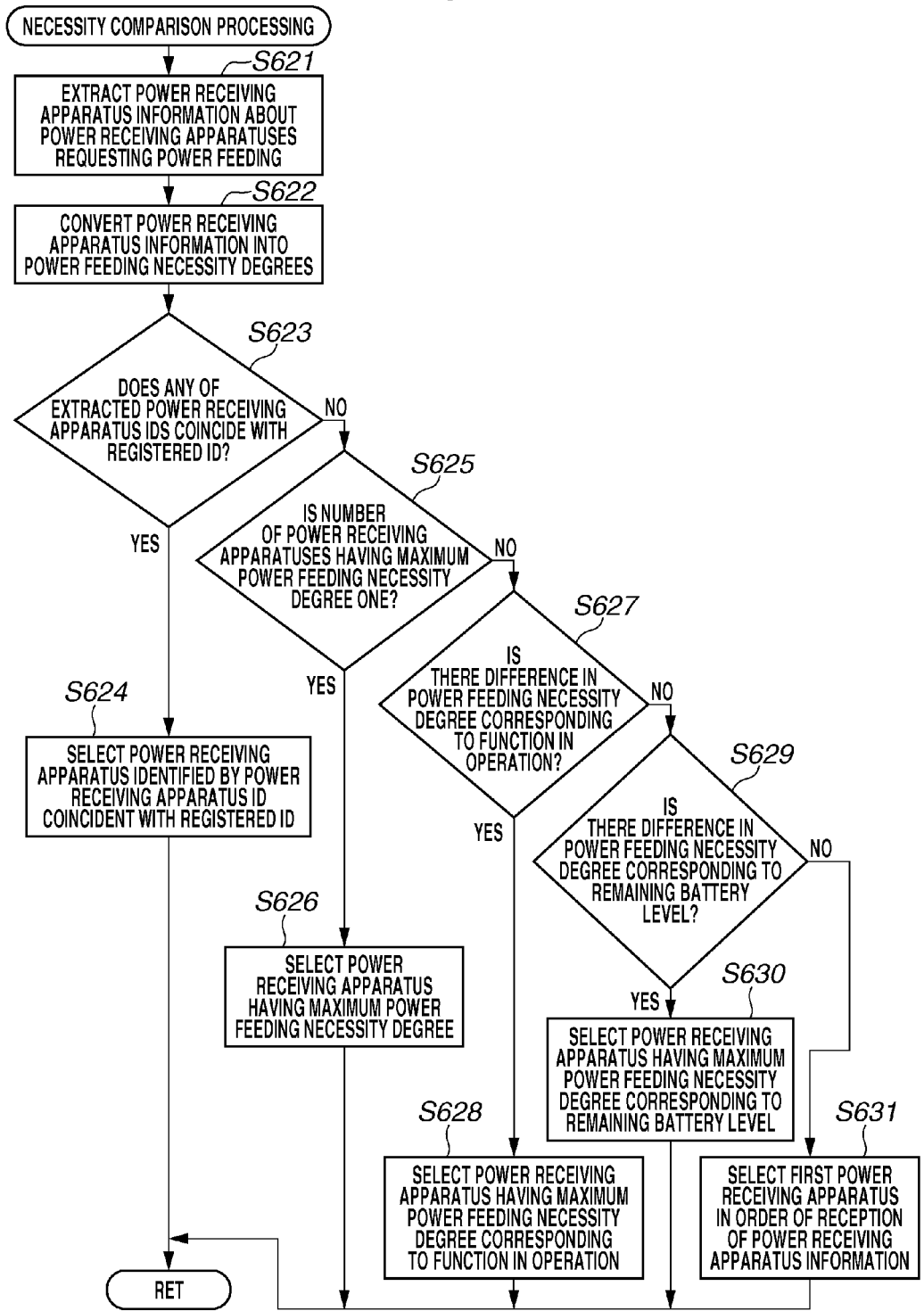
FIG. 22 is a flowchart illustrating necessity comparison processing.

FIG. 22 is a flowchart illustrating details of the necessity comparison processing of the image forming apparatus 11 which has been described with reference to FIG. 19. In step S621, the CPU 104 of the image forming apparatus 11 extracts power receiving apparatus information from the power receiving apparatus information table 310. More specifically, the CPU 104 extracts the power receiving apparatus ID 312, the function in operation 314, the presence or absence of secondary battery 315, and the remaining battery level 316 of the power receiving apparatuses 20 requesting power feeding.

In step S622, the CPU 104 converts the extracted power receiving apparatus information into power feeding necessity degrees. The power feeding necessity degrees are numerical values indicating the degrees to which the power receiving apparatuses 20 need power feeding. The CPU 104 calculates the power feeding necessity degrees by LUT conversion and arithmetic calculations. More specifically, the CPU 104 converts the pieces of information about the power receiving apparatus ID 312, the function in operation 314, the presence or absence of secondary battery 315, and the remaining battery level 316 into power feeding necessity degrees. The CPU 104 multiplies the obtained plurality of power feeding necessity degrees to obtain a power feeding necessity degree of each power receiving apparatus 20.

In the processing for converting the function in operation into a power feeding necessity degree, the CPU 104 calculates the power feeding necessity degree depending on whether the function needs real-timeness. For example, between the phone call and download functions, the phone call function needs higher real-timeness. In the conversion processing, the CPU 104 converts the phone call and download functions into power feeding necessity degrees of, e.g., 0.9 and 0.6, respectively.

The processing for converting the power receiving apparatus information into power feeding necessity degrees is not limited to that of the exemplary embodiment. In other examples, the CPU 104 may convert the power receiving apparatus information into power feeding necessity degrees only by LUT conversion or only by arithmetic calculations.

In step S623, the CPU 104 determines whether any of the power receiving apparatus IDs extracted in step S621 coincides with a registered ID. The registered ID refers to the power receiving apparatus ID of a power receiving apparatus 20 that is to be fed power by priority. The registered ID is stored in the RAM 105 in advance. The registered ID can be registered and modified as appropriate by user operations.

In step S623, if one of the power receiving apparatus IDs coincides with the registered ID (YES in step S623), the processing proceeds to step S624. In step S624, the CPU 104 selects the power receiving apparatus 20 identified by the power receiving apparatus ID coincident with the registered ID as the power receiving apparatus 20 to be fed power.

In step S623, if none of the power receiving apparatus IDs coincides with the registered ID (NO in step S623), the processing proceeds to step S625. If there is no registered ID, the processing also proceeds to step S625.

In step S625, the CPU 104 determines whether the number of power receiving apparatuses 20 having the maximum power feeding necessity degree calculated in step S622 is one. In step S625, if the number of such power receiving apparatuses 20 is one (YES in step S625), then in step S626, the CPU 104 selects the power receiving apparatus 20 having the maximum value as the power receiving apparatus 20 to be fed power. In step S625, if there are two or more power receiving apparatuses 20 having the same maximum value (NO in step S625), the processing proceeds to step S627.

In step S627, the CPU 104 compares the power feeding necessity degrees obtained from the functions in operation in the respective power receiving apparatuses 20 having the maximum power feeding necessity degree. In step S627, if there is a difference in the power feeding necessity degree corresponding to the function in operation (YES in step S627), then in step S628, the CPU 104 selects the power receiving apparatus 20 having the maximum power feeding necessity degree corresponding to the function in operation as the power receiving apparatus 20 to be fed power.

In step S627, if there is no difference in the power feeding necessity degrees respectively corresponding to the functions in operation, i.e., the power feeding necessity degrees corresponding to the respective functions in operation have the same value (NO in step S627), the processing proceeds to step S629.

In step S629, the CPU 104 compares the power feeding necessity degrees obtained from the remaining battery levels of the respective power receiving apparatuses 20 having the maximum power feeding necessity degree. In step S629, if there is a difference in the power feeding necessity degrees respectively corresponding to the remaining battery levels (YES in step S629), then in step S630, the CPU 104 selects the power receiving apparatus 20 having the maximum power feeding necessity degree corresponding to the remaining battery level as the power receiving apparatus 20 to be fed power.

In step S629, if there is no difference in the power feeding necessity degrees respectively corresponding to the remaining battery levels (NO in step S629), the processing proceeds to step S631. In step S631, the CPU 104 selects the power receiving apparatus 20 earliest in the order of reception of the power receiving apparatus information as the power receiving apparatus 20 to be fed power. After such processing, the processing proceeds to step S607 (FIG. 19). The processing of steps S624, S626, S628, S630, and S631 is an example of apparatus selection processing (apparatus selection step).

Processing for assigning the power receiving apparatuses 20 to the first and second power transfer channels 116 of the image forming apparatus 11 will be specifically described with reference to FIGS. 23 to 26. FIG. 23 is a sequence diagram illustrating processing by which the image forming apparatus 11 assigns a power receiving apparatus 20 to the first power transfer channel 116.

The following description deals with a case where three power receiving apparatuses 20 having respective power receiving apparatus IDs of "AA", "BB", and "CC" are detected at the time of transmission of an ID request in step S121.

The CPU 104 of the image forming apparatus 10 ends initialization processing and becomes capable of wireless power feeding. In step S601 in FIG. 19, the CPU 104 issues a power receiving apparatus ID request to the power receiving apparatuses 20. In step S701 in FIG. 21, the three power receiving apparatuses 20 having the respective power receiving apparatus IDs of "AA", "BB", and "CC" each receive the notification of the power receiving apparatus ID, and make an ID response to the image forming apparatus 11. The power receiving apparatuses 20 each make the ID response by embedding their own power receiving apparatus ID into the power receiving apparatus ID 5211.

The image forming apparatus 10 receives the ID responses from the three power receiving apparatuses 20, and stores the power receiving apparatus IDs of the power receiving apparatuses 20 into the power receiving apparatus ID 312 of the power receiving apparatus information table 310 in order of reception of the ID responses.

In step S603 in FIG. 19, the image forming apparatus 10 transmits a power receiving apparatus information request to the three power receiving apparatuses 20 respectively having the power receiving apparatus IDs of "AA", "BB", and "CC" from the wireless transmission and reception unit 101 of the first power transfer channel 116.

In step S702 in FIG. 21, the three power receiving apparatuses 20 each check their power receiving apparatus information, and store the power supply state and the function in operation into their power supply state storage unit and in-operation function storage unit, respectively. In a case where the power receiving apparatus 20 having the power receiving apparatus ID of "AA" is on a phone call, the power receiving apparatus 20 having the power receiving apparatus ID of "AA" stores a phone call into the in-operation function storage unit as the function in operation. The power receiving apparatus 20 having the power receiving apparatus ID of "AA" further stores information about a remaining battery level of 10% and information that the secondary battery 270 is present into the power supply state storage unit.

The power receiving apparatus 20 having the power receiving apparatus ID of "AA" determines whether to make a power receiving request, according to a determination condition based on the power supply state and the function in operation. In a case where there is set a determination condition that a predetermined target function is in operation and the remaining battery level is 10% or less, and target functions include a phone call, the power receiving apparatus 20 having the power receiving apparatus ID of "AA" determines to make a power feeding request since the determination condition is satisfied.

In step S705 in FIG. 21, the power receiving apparatus 20 having the power receiving apparatus ID of "AA" transmits a response frame obtained by embedding the presence of the power feeding request into the presence or absence of power feeding request 5121 to the image forming apparatus 11.

For the power receiving apparatus 20 having the power receiving apparatus ID of "BB", it is supposed that the download function is in operation and the remaining battery level is 50%. In step S702 in FIG. 21, the power receiving apparatus 20 having the power receiving apparatus ID of "BB" stores download into the in-operation function storage unit as the function in operation, and information about the remaining battery level of 50% and information that the secondary battery 270 is present into the power supply state storage unit.

The power receiving apparatus 20 having the power receiving apparatus ID of "BB" determines whether to make a power feeding request, according to the determination condition based on the power supply state and the function in operation. The target functions shall include download. In such a case, the power receiving apparatus determines to make a power feeding request since the predetermined condition is satisfied.

In step S705 in FIG. 21, the power receiving apparatus 20 having the power receiving apparatus ID of "BB" transmits a response frame obtained by embedding the presence of the power feeding request into the presence or absence of power feeding request 5121 to the image forming apparatus 11.

It is supposed that the power receiving apparatus 20 having the power receiving apparatus ID of "CC" is in a sleep state. In step S702 in FIG. 21, the power receiving apparatus 20 having the power receiving apparatus ID of "CC" then stores sleep into the in-operation function storage unit as the function in operation, and stores information about the remaining battery level of 0% and the absence of the secondary battery 270 into the power supply state storage unit.

The power receiving apparatus 20 having the power receiving apparatus ID of "CC" determines whether to make a power feeding request, according to the determination condition based on the power supply state and the function in operation. In a case where the target functions include sleep, the power receiving apparatus 20 having the power receiving apparatus ID of "CC" determines to make a power feeding request since the determination condition is satisfied. In step S705 in FIG. 21, the power receiving apparatus 20 having the power receiving apparatus ID of "CC" transmits a response frame obtained by embedding the presence of the power feeding request into the presence or absence of power feeding request 5121 to the image forming apparatus 11.

The image forming apparatus 11 receives the response frames of the power receiving apparatus information via the wireless transmission and reception unit 101 of the first power transfer channel 116. The image forming apparatus 11 stores the presence or absence of power feeding request, the presence or absence of secondary battery, the remaining battery level, the function in operation, and the power receiving apparatus ID included in the power receiving apparatus information into the power receiving apparatus information table 310 in association with the ID of the frame format. In step S604 in FIG. 19, the image forming apparatus 11 determines that all the power receiving apparatuses 20 having the power receiving apparatus ID of "AA", "BB", and "CC" request power feeding.

In step S605, since there are three power receiving apparatuses 20 requesting power feeding (YES in step S605), then in step S606, the image forming apparatus 11 calculates and compares the power feeding necessity degrees of the respective three power receiving apparatuses 20 having the power receiving apparatus IDs of "AA", "BB", and "CC".

In step S621 in FIG. 22, the image forming apparatus 11 extracts the power receiving apparatus ID 312, the function in operation 314, the presence or absence of secondary battery 315, and the remaining battery level 316 from the power receiving apparatus information table 310. FIG. 24A illustrates the extracted power receiving apparatus information.

The image forming apparatus 11 calculates power feeding necessity degrees based on the extracted power receiving apparatus information. FIG. 24B illustrates the calculated power feeding necessity degrees. As illustrated in FIG. 24B, the image forming apparatus 11 calculates the pieces of power receiving apparatus information into power feeding necessity degrees, and multiplies the obtained plurality of power feeding necessity degrees to calculate the power feeding necessity degrees of the respective power receiving apparatuses 20.

In step S623 in FIG. 22, the image forming apparatus 11 determines whether one of the power receiving apparatus IDs of "AA", "BB", and "CC" coincides with the registered ID. In a case where the registered ID is "CC", in step S624, the image forming apparatus 11 selects the power receiving apparatus 20 having the power receiving apparatus ID of "CC" as the power receiving apparatus 20 to be fed power.

In step S607 in FIG. 19, the image forming apparatus 11 notifies the selected power receiving apparatus 20 (the power receiving apparatus ID of "CC") of an assignment result indicating that power feeding is assigned thereto. The image forming apparatus 11 notifies the power receiving apparatuses 20 respectively having the power receiving apparatus ID of "AA" and "BB" that power feeding is not assigned thereto.

Since the power receiving apparatuses 20 respectively having the power receiving apparatus IDs of "AA" and "BB" are not assigned to the first power transfer channel 116, the power receiving apparatuses 20 respectively having the power receiving apparatus IDs of "AA" and "BB" end the power feeding operation. Since the power receiving apparatus 20 having the power receiving apparatus ID of "CC" is assigned to the first power transfer channel 116, the image forming apparatus 11 and the power receiving apparatus 20 having the power receiving apparatus ID of "CC" perform power transfer preparation and power transfer therebetween, and end the power transfer.

Through the above processing, the image forming apparatus 11 can assign a certain power receiving apparatus 20 registered in advance (here, the power receiving apparatus 20 having the power receiving apparatus ID of "CC") to the first power transfer channel 116 by priority. In other words, the image forming apparatus 11 can feed power to a certain power receiving apparatus 20 by priority.

Figure 25:
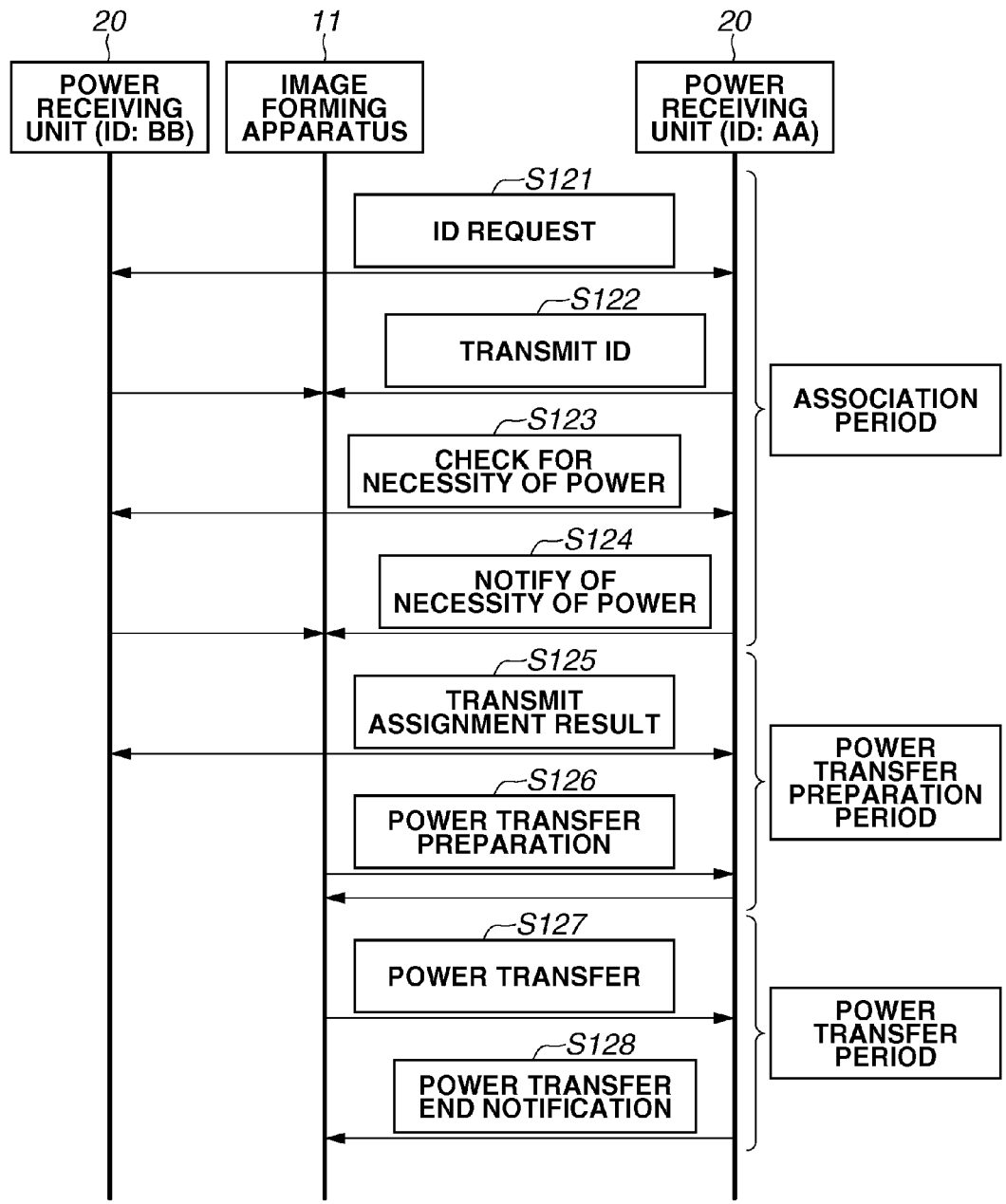
FIG. 25 is a sequence diagram illustrating the assignment processing to two power transfer channels.

FIG. 25 is a sequence diagram illustrating assignment processing for the second power transfer channel 116, which is performed after the assignment processing for the first power transfer channel 116 illustrated in FIG. 23. By the assignment processing illustrated in FIG. 23, the power receiving apparatus 20 having the power receiving apparatus ID of "CC" has been assigned to the first power transfer channel 116. In the assignment processing for the second power transfer channel 116 illustrated in FIG. 26, the processing of steps S121 to S125 is therefore performed between the image forming apparatus 11 and the power receiving apparatuses 20 respectively having the power receiving apparatus ID of "AA" and "BB".

Subsequently, in step S621 in FIG. 22, the image forming apparatus 11 performs the necessity comparison processing. The image forming apparatus 11 extracts the power receiving apparatus ID 312, the function in operation 314, the presence or absence of secondary battery 315, and the remaining battery level 316 from the power receiving apparatus information table 310. FIG. 26A illustrates the extracted power receiving apparatus information.

The image forming apparatus 11 then calculates power feeding necessity degrees based on the extracted power receiving apparatus information. FIG. 26B illustrates the calculated power feeding necessity degrees. As illustrated in FIG. 26B, the image forming apparatus 11 converts the pieces of power receiving apparatus information into power feeding necessity degrees, and multiplies the obtained plurality of power feeding necessity degrees to calculate the power feeding necessity degrees of the respective power receiving apparatuses 20.

In step S623 in FIG. 22, the image forming apparatus 11 determines whether either one of the power receiving apparatus IDs of "AA" and "BB" coincides with the registered ID. Since neither of the power receiving apparatus IDs coincides with the registered ID (NO in step S623), then in step S625, the image forming apparatus 11 determines whether the number of power receiving apparatuses 20 having the maximum power feeding necessity degree is one.

As illustrated in FIG. 26B, the power receiving apparatus 20 having the power receiving apparatus ID of "AA" has a power feeding necessity degree of 0.3645. The power receiving apparatus 20 having the power receiving apparatus ID of "BB" has a power feeding necessity degree of 0.135.

That is, the power feeding necessity degree of the power receiving apparatus 20 having the power receiving apparatus ID of "AA" is the maximum, and the number of power receiving apparatuses 20 having the maximum power feeding necessity degree is one. In step S626, the image forming apparatus 11 therefore selects the power receiving apparatus 20 having the power receiving apparatus ID of "AA" as the power receiving apparatus 20 to be fed power.

In step S607 in FIG. 19, the image forming apparatus 11 notifies the selected power receiving apparatus 20 (having the power receiving apparatus ID of "AA") of an assignment result indicating that power feeding is assigned thereto. The image forming apparatus 11 notifies the power receiving apparatus 20 having the power receiving apparatus ID of "BB" that power feeding is not assigned thereto.

Since the power receiving apparatus 20 having the power receiving apparatus ID of "BB" is not assigned to the second power transfer channel 116, the power receiving apparatus 20 having the power receiving apparatus ID of "BB" ends the power feeding operation. Since the power receiving apparatus 20 having the power receiving apparatus ID of "AA" is assigned to the second power transfer channel 116, the image forming apparatus 11 and the power receiving apparatus 20 having the power receiving apparatus ID of "AA" perform power transfer preparation and power transfer therebetween, and ends the power transfer.

Through the above processing, the image forming apparatus 11 can assign a power receiving apparatus 20 performing a phone call which needs real-timeness (here, the power receiving apparatus 20 having the power receiving apparatus ID of "AA") to the second power transfer cannel 116 by priority.

As described above, the wireless power feeding system according to the second exemplary embodiment can select appropriate power receiving apparatuses 20 to be fed power based on the power supply state and the function in operation of the power receiving apparatuses 20.

The LUTs for converting the power receiving apparatus information including the power supply state and the function in operation into the power feeding necessity degrees may be set and modified as appropriate according to the types and number of power receiving apparatuses 20 and the performance of the image forming apparatus 11. In such a manner, power receiving apparatuses 20 that the user wants to give priority to can be fed power by priority.

In addition, the configuration and processing of the wireless power feeding system according to the second exemplary embodiment are similar to those of the wireless power feeding system according to the first exemplary embodiment.

FIG. 27 is a diagram illustrating a wireless power feeding system according to a third exemplary embodiment. In the wireless power feeding system according to the third exemplary embodiment, an image forming apparatus 12 includes a plurality of internal power receiving apparatuses 22. External power receiving apparatuses 21 are a smartphone and a tablet terminal personal computer (PC). The external power receiving apparatuses 21 can receive auxiliary power from the image forming apparatus 12 and operate. The image forming apparatus 12 according to the present exemplary embodiment includes a standard hardware (HW) unit, a built-in HDD unit, a removable HDD unit, and an extended HW unit as the internal power receiving apparatuses 22. The standard HW unit includes standard HW 281. The built-in HDD unit includes a built-in HDD 282. The removable HDD unit includes a detachably-mounted removable HDD 283. The extended HW unit includes extended HW 284.

The internal power receiving apparatuses 22 each include a CPU 210, a wireless power receiving unit 230, and a wireless transmission and reception unit 200. The external power receiving apparatuses 21 have a similar configuration to that of the power receiving apparatus 20 described with reference to FIG. 3.

The image forming apparatus 12 includes a plurality of power transfer channels 116. More specifically, the image forming apparatus 12 includes at least four power transfer channels 116 for feeding power to the four internal power receiving apparatuses 22 included in the image forming apparatus 12, and one, two, or more power transfer channels 116 for feeding power to the external power receiving apparatuses 21.

FIG. 28 is a flowchart illustrating power feeding processing by the image forming apparatus 12 according to the third exemplary embodiment. The processing of steps S601 to S603 is similar to that of steps S601 to S603 described in the second exemplary embodiment with reference to FIG. 19.

By the processing in steps S601 and S602, the CPU 104 identifies the configuration of an internal and/or external power receiving apparatus or apparatuses 22 and/or 21 capable of power feeding, and authenticates the power receiving apparatus(es) 21 and/or 22. The CPU 104 then performs the processing of step S603. In step S620, the CPU 104 determines whether an ID response is received from an internal power receiving apparatus 22, i.e., whether there is an internal power receiving apparatus 22.

If there is an internal power receiving apparatus 22 (YES in step S620), the processing proceeds to step S621. If there is no internal power receiving apparatus 22 (NO in step S620), the processing proceeds to step S622.

In step S621, the CPU 104 calculates an estimated amount of power consumption of the image forming apparatus including the amount of power consumption of the internal power receiving apparatus(es) 22 having transmitted the ID response(s). In step S622, the CPU 104 determines whether an ID response is received from an external power receiving apparatus 21, i.e., whether there is an external power receiving apparatus 21.

If there is an external power receiving apparatus 21 (YES in step S622), the processing proceeds to step S623. If there is no external power receiving apparatus 21 (NO in step S622), the processing proceeds to step S627.

In step S623, the CPU 104 calculates the amount of surplus power by Eq. (3):

$$\text{(Amount of surplus power)} = \text{(amount of power that power supply unit can supply)} - \text{(amount of power consumption of internal power receiving apparatus(es))}. \quad \text{Eq. (3)}$$

The amount of surplus power refers to the amount of power that can be fed to the external power receiving apparatus(es) 21 when the image forming apparatus 12 consumes the foregoing amount of power consumption.

In step S624, the CPU 104 determines whether there is a power feeding request from the external power receiving apparatus(es) 21. If there is such a power feeding request (YES in step S624), the processing proceeds to step S625. If there is no such power feeding request (NO in step S624), the processing proceeds to step S627.

In step S625, the CPU 104 determines whether the amount of surplus power is sufficient. Specifically, the CPU 104 calculates a power feeding determination value by Eq. (4):

$$\text{(Power feeding determination value)} = \text{(amount of surplus power)} - \text{(amount of power needed for external power receiving apparatus(es))}. \quad \text{Eq. (4)}$$

If the power feeding determination value is greater than or equal to 0, the CPU 104 determines that the amount of surplus power is sufficient.

If the amount of surplus power is sufficient (YES in step S625), the processing proceeds to step S626. If the amount of surplus power is insufficient (NO in step S625), the processing proceeds to step S627.

The processing of steps S620 to S627 is an example of power feeding control processing for controlling power feeding to the external power receiving apparatuses 21 based on the amount of power consumption inside the image forming apparatus 12 (the amount of power to be fed power inside the image forming apparatus 12).

In step S626, the CPU 104 selects the internal power receiving apparatus(es) 22 and the external power receiving apparatus(es) 21 having transmitted the power feeding request(s) as the power receiving apparatuses to be fed power. Then, the processing proceeds to step S607. In step S627, the CPU 104 selects only the internal power receiving apparatus(es) 22 as the power receiving apparatus(es) to be fed power. Then, the processing proceeds to step S607.

The CPU 104 receives a job before performing the processing in steps S626 and S627. In steps S626 and S627, the CPU 104 selects the power receiving apparatus(es) 21 and/or 22 that the CPU 104 accesses in the received job as the one(s) to be fed power.

In step S609, the CPU 104 starts power transfer. In step S628, the CPU 104 ends power feeding when the job input by an external power receiving apparatus 21 or a not-illustrated host computer ends. In the processing in step S609, the CPU 104 feeds power to the internal power receiving apparatus(es) 22 and/or the external power receiving apparatus(es) 21. The processing in step S609 is an example of first power feeding processing and second power feeding processing.

FIG. 29 is a diagram illustrating the power feeding processing according to the third exemplary embodiment and the states of an internal power receiving apparatus 22 and an external power receiving apparatus 21 along a time axis. At timing T11 illustrated in FIG. 29, the power feeding processing is started. At timing T12, the processing in step S603 ends. At timing T11, the CPU 104 starts feeding power to the internal power receiving apparatus 22 via a power transfer channel 116. The CPU 104 continues feeding power until timing T12. The reason for such power feeding is that the internal power receiving apparatus 22 needs power to communicate with the wireless transmission and reception unit 101.

At timing T12, the CPU 104 ends the identification and authentication of the power receiving apparatuses 21 and 22, and once stops feeding power to the internal power receiving apparatus 22. In the period from timing T12 to T13, the CPU 104 performs the processing of steps S620 to S625. T13 refers to timing when the CPU 104 receives a job.

At timing T13, the CPU 104 receives a job. The CPU 104 performs the processing in step S626 or S627 to determine the power receiving apparatus(es) to be fed power, and performs the processing in steps S607 and S608. In the period from timing T14 to T15, the CPU 104 performs the processing in step S609 to feed power to the power receiving apparatus(es) to be fed power. T15 refers to timing when the job ends.

For example, in a case where, in step S626, the CPU 104 selects the external power receiving apparatus 21 and the internal power receiving apparatus 22 as the power receiving apparatuses to be fed power, in the period from timing T14 to T15, the CPU 104 performs the processing in step S609 to feed power to the external and internal power receiving apparatuses 21 and 22 from the power transfer channels 116.

In a case where, in step S627, the CPU 104 selects only the internal power receiving apparatus 22 as the power receiving apparatus to be fed power, in the period from timing T14 to T15, the CPU 104 performs the processing of S609 to feed power to the internal power receiving apparatus 22 from the power transfer channel 116. At timing T15, the CPU 104 stops feeding power from the power transfer channel(s) 116.

In such a manner, the wireless power feeding system according to the third exemplary embodiment can feed power to the internal power receiving apparatuses 22 by priority, and feed power to even the external power receiving apparatuses 21 if there is surplus power. Like the wireless power feeding systems according to the other exemplary embodiments, the wireless power feeding system according to the third exemplary embodiment can thus appropriately control the power feeding to a plurality of power receiving apparatuses including the internal power receiving apparatuses 22.

In addition, the configuration and processing of the wireless power feeding system according to the third exemplary embodiment are similar to those of the wireless power feeding systems according to the other exemplary embodiments.

Figure 30:
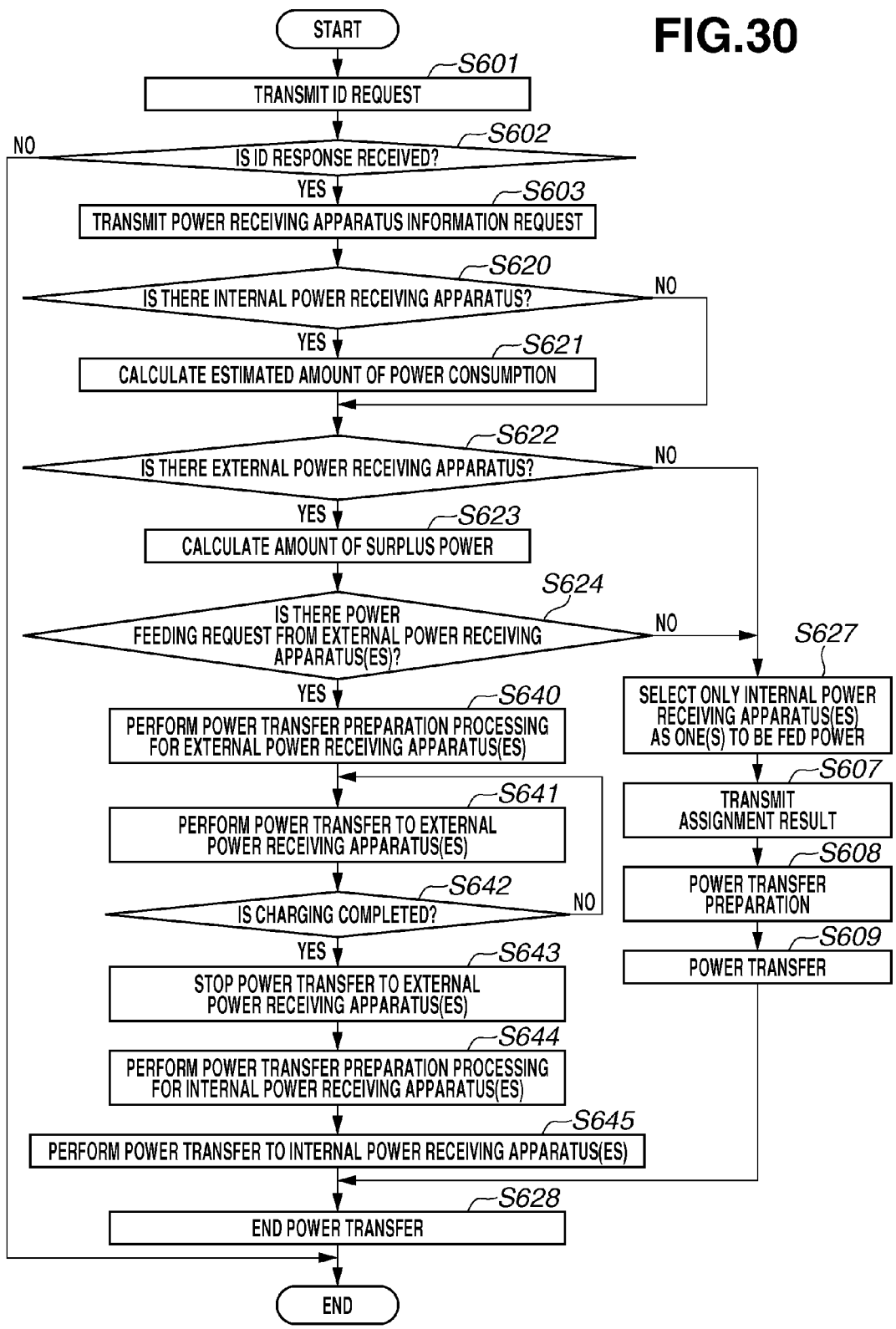
FIG. 30 is a flowchart illustrating power feeding processing.

Modifications of the wireless power feeding system according to the third exemplary embodiment will be described. FIG. 30 is a flowchart illustrating power feeding processing of a wireless power feeding system according to a first modification. In the wireless power feeding system according to the first modification, if the image forming apparatus 12 receives a power feeding request from an external power receiving apparatus 21, the image forming apparatus 12 feeds power to the external power receiving apparatus 21 having transmitted the power feeding request before receiving a job.

As illustrated in FIG. 30, if, in step S624, a power feeding request is received from an external power receiving apparatus 21 (YES in step S624), the processing proceeds to step S640. In step S640, the CPU 104 performs power transfer preparation processing for the external power receiving apparatus 21 having transmitted the power feeding request as the power receiving apparatus to be fed power. In step S641, the CPU 104 performs power transfer to the external power receiving apparatus 21 to be fed power. The CPU 104 continues the power transfer in step S641 until the charging of the external power receiving apparatus 21 is completed (while NO in step S642).

In step S642, if the charging is completed (YES in step S642), the processing proceeds to step S643. The processing also proceeds to step S643 if the CPU 104 has received a job. In step S634, the CPU 104 stops the power transfer to the external power receiving apparatus 21 to be fed power. When the CPU 104 receives a job, in step S644, the CPU 104 starts power transfer preparation processing for the internal power receiving apparatus(es) 22. In step S645, the CPU 104 performs power transfer to the internal power receiving apparatus(es) 22. Then, the processing proceeds to step S628.

The rest of the processing is similar to that of the power feeding processing described in the third exemplary embodiment with reference to FIG. 28.

Figure 31:
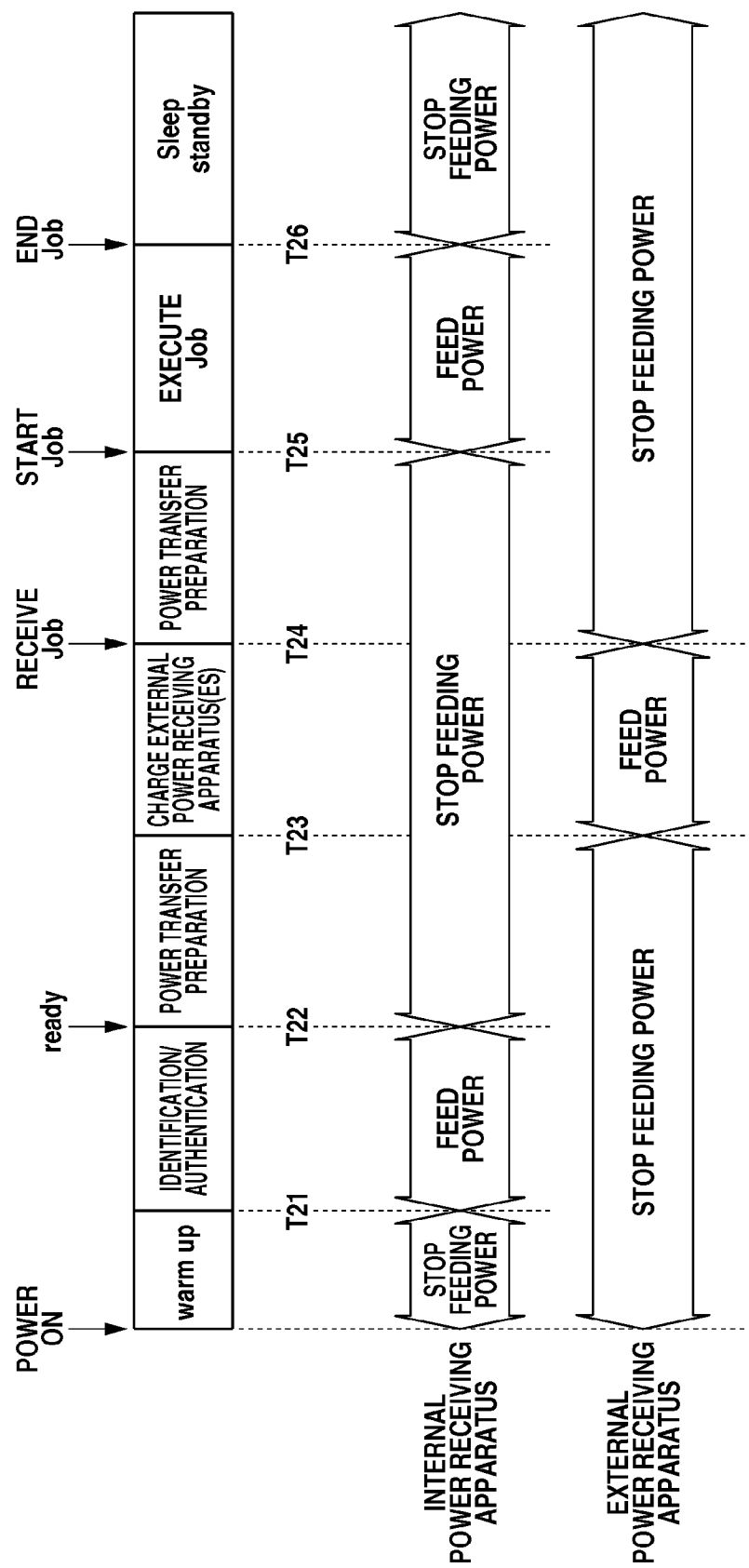
FIG. 31 is a diagram illustrating the power feeding processing.

FIG. 31 is a diagram illustrating the power feeding processing according to the first modification and the states of an external power receiving apparatus 21 and an internal power receiving apparatus 22 along a time axis. As illustrated in FIG. 31, at timing T22, the processing of step S603 ends. In step S640, the CPU 104 perform power transfer preparation for the external power receiving apparatus 21.

When the power transfer preparation in step S640 ends, at timing T23, in step S641, the CPU 104 performs power transfer (power feeding) to the external power receiving apparatus 21. If the charging is completed at timing T24 (YES in step S642), then in step S643, the CPU 104 stops the power transfer to the external power receiving apparatus 21.

After timing T24, in step S644, the CPU 104 performs power transfer preparation for the internal power receiving apparatus 22. At timing T25, in step S645, the CPU 104 performs power transfer to the internal power receiving apparatus 22.

As described above, according to the first modification, the image forming apparatus 12 feeds power to the external power receiving apparatus(es) 21 before executing a job. In such a manner, the image forming apparatus 12 can feed power to the internal power receiving apparatuses 22 by priority during the execution of the job. This can prevent the job from failing to be completed because the external power receiving apparatuses 21 run short of power.

A second modification of the wireless power feeding system according to the third exemplary embodiment will be described. The wireless power feeding system according to the second modification controls power feeding on and off in each phase of a job after the start of power transfer with the internal and/or external power receiving apparatus(es) 21 and/or 22 as the power receiving apparatus(es) to be fed power.

For example, when the image forming apparatus 12 executes a job, apparatuses to make data access can vary from one phase of the job to another. For example, the power receiving apparatuses 21 and/or 22 to be fed power may access data only in a short time. The power receiving apparatuses 21 and/or 22 to be fed power may access data in discrete timing. In such cases, the power receiving apparatuses 21 and/or 22 to be fed power waste power in an idle state.

In the second modification, the wireless power feeding system controls on and off the power feeding to the power receiving apparatuses to be fed power in units of job phases for further power saving.

Figure 32:
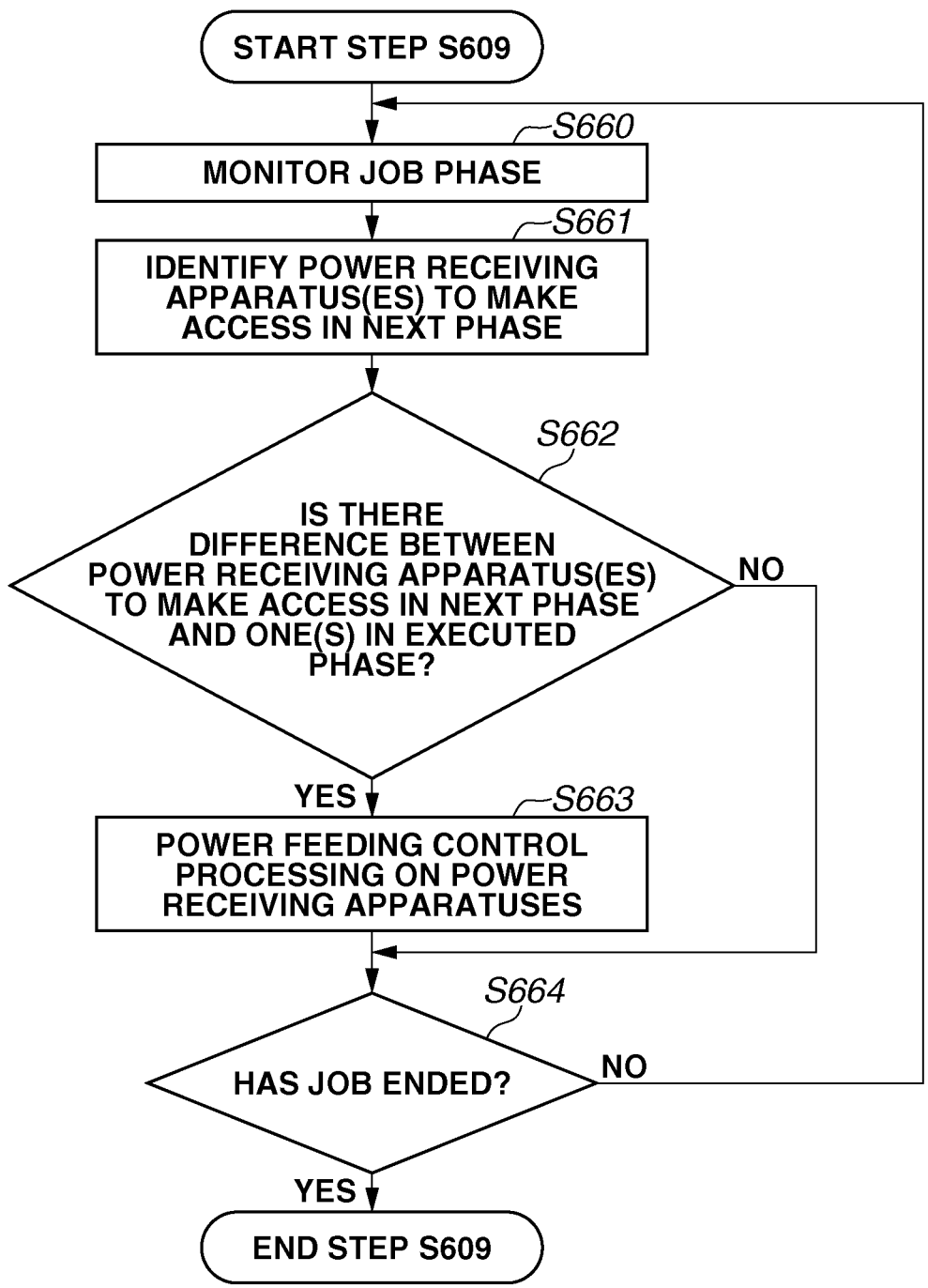
FIG. 32 is a flowchart illustrating power transfer processing.

FIG. 32 is a flowchart illustrating detailed processing of the power transfer processing (step S609) according to the second modification. In the second modification, in step S609, the image forming apparatus 12 starts power transfer to the external and/or internal power receiving apparatus(es) 21 and/or 22 to be fed power. In step S660, the CPU 104 monitors each phase processed in the job.

Each time a phase ends, the processing proceeds to step S661. In step S661, the CPU 104 identifies the external and/or internal power receiving apparatus(es) 21 and/or 22 to make data input/output (access) based on the contents of the job to be executed in the next phase.

In step S662, the CPU 104 determines whether there is a difference between the external and/or internal power receiving apparatus(es) 21 and/or 22 to make access in the next phase and the one(s) in the executed phase.

In step S662, if there is a difference (YES in step S662), the processing proceeds to step S663. If there is no difference (NO in step S663), the proceeding proceeds to step S664. In step S663, the CPU 104 stops feeding power to the power receiving apparatus(es) 21 and/or 22 that do not make access in the next phase, and starts feeding power to the new power receiving apparatus(es) 21 and/or 22 that make access.

In step S664, the CPU 104 determines whether the job has ended. If the job has ended (YES in step S664), the CPU 104 ends the power transfer processing. The processing then proceeds to step S628 (FIG. 28). If the job has not ended (NO in step S664), the processing proceeds to step S660.

Figure 33:
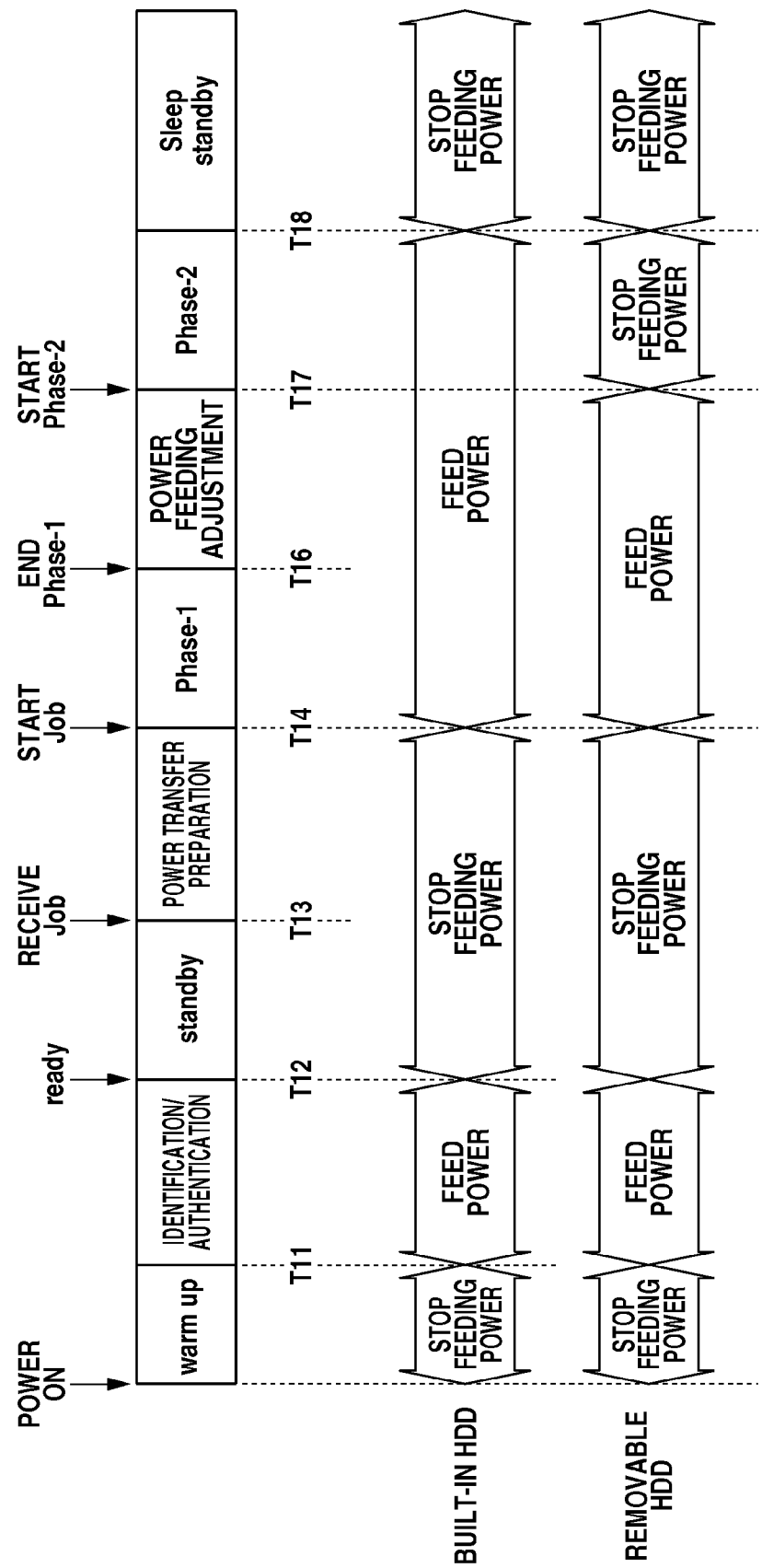
FIG. 33 is a diagram illustrating the power feeding processing.

FIG. 33 is a diagram illustrating the power feeding processing and the states of two internal power receiving apparatuses 22 along a time axis, where the power feeding to the internal power receiving apparatuses 22 is controlled by the power feeding control processing (step S663) illustrated in FIG. 32.

It is supposed that access to the built-in HDD 282 and the removable HDD 283 occurs in phase-1 of a job, and in phase-2, access to the built-in HDD 282 occurs but not to the removable HDD 283.

In such a case, as illustrated in FIG. 33, the image forming apparatus 12 performs power transfer to the built-in HDD 282 and the removable HDD 283 in phase-1. In phase-2, the image forming apparatus 12 continues the power transfer to the built-in HDD 282 and stops the power transfer to the removable HDD 283.

In such a manner, the image forming apparatus 12 can achieve power saving by feeding power only to the internal power receiving apparatus(es) 22 to make access.

Figure 34:
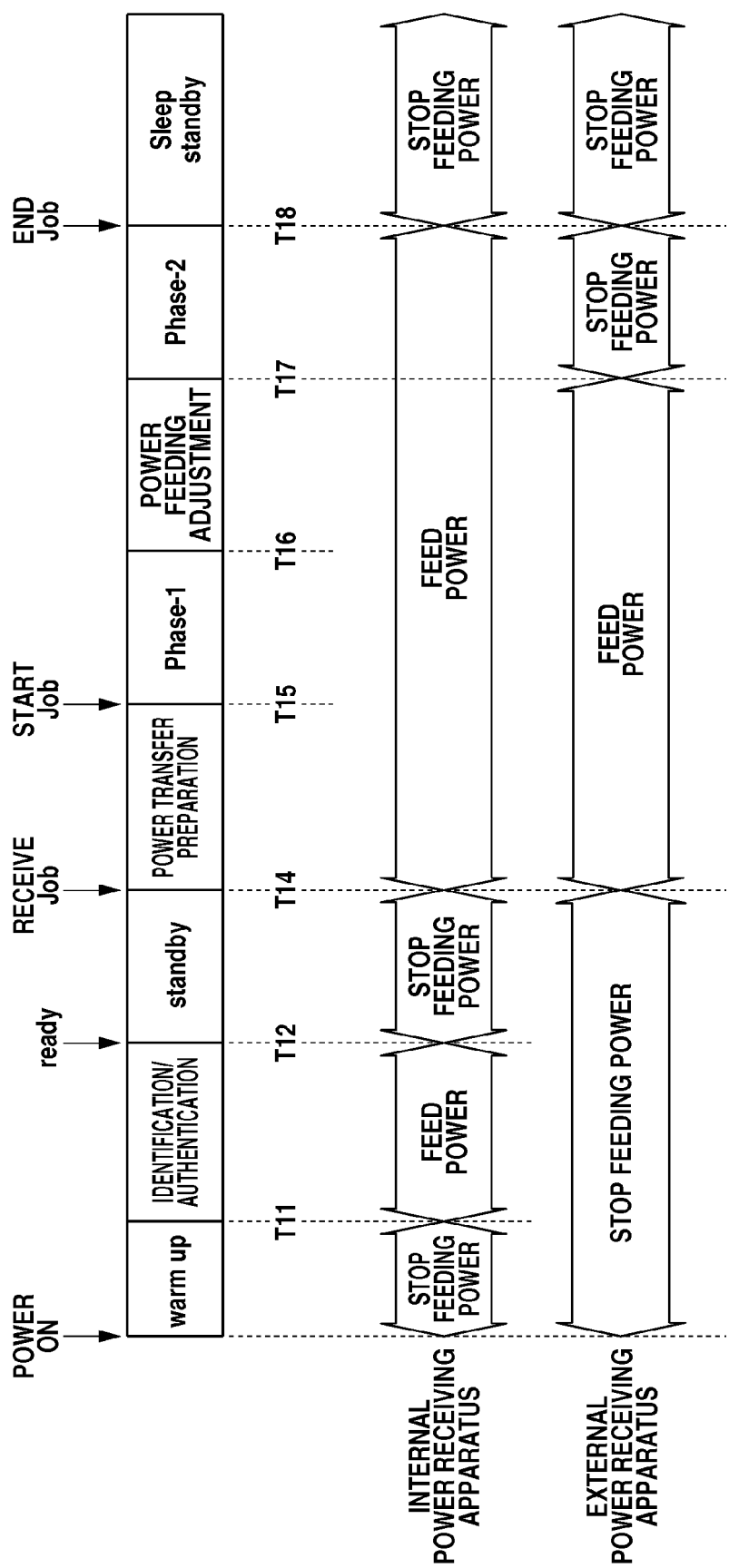
FIG. 34 is a diagram illustrating the power feeding processing.

FIG. 34 is a diagram illustrating the power feeding processing and the states of an external power receiving apparatus 21 and an internal power receiving apparatus 22 along a time axis, where the power feeding to the power receiving apparatuses 21 and 22 is controlled by the power feeding control processing (step S663) illustrated in FIG. 32.

In a case where access to the internal power receiving apparatus 22 and the external power receiving apparatus 21 occurs in phase-1 of the job, and in phase-2, access to the internal power receiving apparatus 22 occurs but not to the external power receiving apparatus 21, as illustrated in FIG. 34, the image forming apparatus 12 performs power transfer to the internal power receiving apparatus 22 and the external power receiving apparatus 21 in phase-1. In phase-2, the image forming apparatus 12 continues the power transfer to the internal power receiving apparatus 22 and stops the power transfer to the external power receiving apparatus 21.

In such a manner, the image forming apparatus 12 can achieve power saving by feeding power to the external power receiving apparatus 21 only when access to the external power receiving apparatus 21 occurs.

FIG. 35 is a diagram illustrating the power feeding processing and the states of two externals power receiving apparatuses 21 and an internal power receiving apparatus 22 along a time axis, where the power feeding to the power receiving apparatuses 21 and 22 is controlled by the power feeding control processing (step S663) illustrated in FIG. 32.

It is supposed that in phase-1 of the job, access to the internal power receiving apparatus 22 occurs. Access also occurs to the two external receiving apparatuses 21 which are a smartphone and a tablet PC, respectively.

In phase-2, access to the internal power receiving apparatus 22 and the smartphone occurs but not to the tablet PC. In phase-3, access to the internal power receiving apparatus 22 and the tablet PC occurs but not to the smartphone.

In such a case, as illustrated in FIG. 35, the CPU 104 performs power transfer to the internal power receiving apparatus 22, the smartphone, and the tablet PC in phase-1. In phase-2, the CPU 104 continues the power transfer to the internal power receiving apparatus 22 and the smartphone, and stops the power transfer to the tablet PC. In phase-3, the CPU 104 continues feeding power to the internal power receiving apparatus 22, stops feeding power to the smartphone, and resumes feeding power to the tablet PC.

In such a manner, the image forming apparatus 12 can achieve power saving by controlling power feeding to each of the plurality of external power receiving apparatuses 21 according to the presence or absence of access.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-080687 filed Apr. 8, 2013, which is hereby incorporated by reference herein in its entirety.

What is claimed is:

1. A power feeding apparatus comprising:
a power feeding unit configured to wirelessly feed power to a power receiving apparatus;
a reception unit configured to receive, from a first power receiving apparatus, remaining battery level information of a secondary battery of the first power receiving apparatus;
a determination unit configured to determine power feeding time for feeding of power to the first power receiving apparatus, based on the remaining battery level information;
a first switching unit configured to switch a power feeding destination from the first power receiving apparatus to a second power receiving apparatus according to a lapse of the power feeding time from start of power feeding to the first power receiving apparatus; and
a second switching unit configured to switch the power feeding destination from the first power receiving apparatus to the second power receiving apparatus in response to the power feeding apparatus receiving a stop request of power feeding from the first power receiving apparatus even before the lapse of the power feeding time.

2. The power feeding apparatus according to claim 1, wherein the remaining battery level information indicates a ratio of a remaining battery level of the secondary battery to electrical energy of the secondary battery at a full charge.

3. A power feeding method to be performed by a power feeding apparatus, the power feeding method comprising:
wirelessly feeding power to a power receiving apparatus;
receiving, from a first power receiving apparatus, remaining battery level information of a secondary battery of the first power receiving apparatus;
determining power feeding time for feeding of power to the first power receiving apparatus, based on the remaining battery level information;

switching a power feeding destination from the first power receiving apparatus to a second power receiving apparatus according to a lapse of the power feeding time from start of power feeding to the first power receiving apparatus; and switching the power feeding destination from the first power receiving apparatus to the second power receiving apparatus in response to the power feeding apparatus receiving a stop request of power feeding from the first power receiving apparatus even before the lapse of the power feeding time.

4. A non-transitory computer-readable storage medium storing a program for causing a computer to function as:
   a power feeding unit configured to wirelessly feed power to a power receiving apparatus;
   a reception unit configured to receive, from a first power receiving apparatus, remaining battery level information of a secondary battery of the first power receiving apparatus;
   a determination unit configured to determine power feeding time for feeding of power to the first power receiving apparatus, based on the remaining battery level information;
   a first switching unit configured to switch a power feeding destination from the first power receiving apparatus to a second power receiving apparatus according to a lapse of the power feeding time from start of power feeding to the first power receiving apparatus; and
   a second switching unit configured to switch the power feeding destination from the first power receiving apparatus to the second power receiving apparatus in response to the power feeding apparatus receiving a stop request of power feeding from the first power receiving apparatus even before the lapse of the power feeding time.

5. The power feeding apparatus according to claim 1, wherein the power feeding apparatus is a printing apparatus that has a print function.

* * * * *